United States Patent
Lee et al.

(10) Patent No.: US 9,522,488 B2
(45) Date of Patent: Dec. 20, 2016

(54) TENTER OVEN AND MANUFACTURING METHOD FOR STRETCHED FILM

(75) Inventors: Doseok Lee, Seoul (KR); Takuya Kawagoe, Shiga (JP); Hiroyuki Inoue, Shiga (JP)

(73) Assignee: Toray Industries, Inc. (JP)

( * ) Notice: Subject to any disclaimer, the term of this patent is extended or adjusted under 35 U.S.C. 154(b) by 450 days.

(21) Appl. No.: 14/007,780

(22) PCT Filed: Mar. 23, 2012

(86) PCT No.: PCT/JP2012/057462
§ 371 (c)(1),
(2), (4) Date: Sep. 26, 2013

(87) PCT Pub. No.: WO2012/133152
PCT Pub. Date: Oct. 4, 2012

(65) Prior Publication Data
US 2014/0013612 A1  Jan. 16, 2014

(30) Foreign Application Priority Data

Mar. 29, 2011 (JP) .................................. 2011-071955
Nov. 16, 2011 (JP) .................................. 2011-250286

(51) Int. Cl.
| | | |
|---|---|---|
| *B29C 35/04* | (2006.01) | |
| *F26B 13/00* | (2006.01) | |
| *F26B 21/00* | (2006.01) | |
| *B29C 55/08* | (2006.01) | |
| *B29C 55/20* | (2006.01) | |

(52) U.S. Cl.
CPC ............. *B29C 35/045* (2013.01); *B29C 55/08* (2013.01); *B29C 55/20* (2013.01); *F26B 13/00* (2013.01); *F26B 21/004* (2013.01)

(58) Field of Classification Search
CPC ...... F26B 13/00; F26B 21/004; B29C 35/045; B29C 55/08; B29C 5/20
See application file for complete search history.

(56) References Cited

U.S. PATENT DOCUMENTS

| | | | | |
|---|---|---|---|---|
| 2,736,081 A | * | 2/1956 | Dungler | ............... D06C 3/00 26/92 |
| 2010/0059036 A1 | | 3/2010 | Inoue et al. | |
| 2010/0276826 A1 | | 11/2010 | Takahata et al. | |

FOREIGN PATENT DOCUMENTS

| | | |
|---|---|---|
| JP | 63-076714 | 4/1988 |
| JP | 05-096619 | 4/1993 |
| JP | 10-249933 | 9/1998 |
| JP | 2001-162635 | 6/2001 |

(Continued)

OTHER PUBLICATIONS

European Extended Search Report issued Oct. 21, 2014 from corresponding European Application No. 12764064.7.

*Primary Examiner* — Jiping Lu
(74) *Attorney, Agent, or Firm* — DLA Piper LLP (US)

(57) ABSTRACT

A tenter oven stretches a thermoplastic resin film in the width direction thereof, wherein an air blowing nozzle provided therein that blows heated air onto a film running along a film passing surface is a proximate nozzle in which an air blowing opening provided on the air blowing surface thereof is formed as a slit, a distance (L) between the air blowing surface and the film passing surface and a slit width (B) of the slit satisfy the relationship expressed by the equation, (L/B)≤10, and the distance (L) is 150 mm or less.

19 Claims, 7 Drawing Sheets

(56) References Cited

FOREIGN PATENT DOCUMENTS

| | | |
|---|---|---|
| JP | 2002-018970 | 1/2002 |
| JP | 2002-219747 | 8/2002 |
| JP | 2003-025420 | 1/2003 |
| JP | 2005-008407 | 1/2005 |
| JP | 2009-93168 | 4/2009 |
| JP | 2009-178992 | 8/2009 |
| JP | 2009-255511 | 11/2009 |
| WO | 2008/114586 A1 | 9/2008 |

* cited by examiner

TENTER OVEN AND MANUFACTURING METHOD FOR STRETCHED FILM

TECHNICAL FIELD

This disclosure relates to a tenter oven suited to the manufacture of a stretched thermoplastic resin film and a method of manufacturing stretched thermoplastic resin films that use such a tenter oven.

BACKGROUND

Known manufacturing methods for a stretched thermoplastic resin film include the sequential biaxial stretching method, in which an unstretched thermoplastic resin film is first stretched in the length direction to obtain a uniaxial stretched film and then the obtained uniaxial stretched film is stretched in the width direction by introducing it into a tenter oven and the simultaneous biaxial stretching method, in which an unstretched thermoplastic resin film is introduced into a tenter oven and stretched in both the length and width directions simultaneously.

Stretched thermoplastic resin films are used in a wide range of industrial material applications, including packaging. Of all those films, sequential biaxially stretched films of polyester, polyolefin and polyamide resins are, because of their excellent mechanical characteristics, thermal characteristics, electrical characteristics, and so on, particularly widely used and enjoying growing demand in areas where unstretched films are of little use.

However, a tenter oven for manufacturing a stretched thermoplastic resin film has the problem of accompanying air flow induced by running of the film and the problem of a flow of air having a different setting temperature into an adjacent chamber or flow of outside air of the tenter oven into the inside thereof, due to, among other things, an imbalance between the flow rates of heated air blown into the tenter oven and the exhaust air ejected from it which causes incomplete air circulation in each of the chambers in the tenter oven. Each problem is a phenomenon of air flow in the direction of running of the film across the boundaries of the chambers. Such air flow is called "MD" (abbreviation of Machine Direction) flow.

When an MD flow occurs, air having different temperature enters from the outside of a chamber flows in the vicinity of the film and is mixed with heated air blown out of a air blowing nozzle provided inside the chamber. As a result, the film is exposed to a significant temperature unevenness. The temperature unevenness in the width direction of the film is a potential cause of unevenness in film thickness and characteristics, and can therefore not only decrease product quality, but also reduce productivity by causing film tearing inside the tenter oven.

If flows of air at different temperatures mix into a chamber due to an MD flow, namely, if, for instance, air that is cooler than the temperature setting of the circulating air of the chamber mixes into the circulating air, the amount of steam consumed by the heat exchanger to reheat the circulating air to the temperature setting of the chamber increases, thus reducing energy efficiently. Triggered by the accompanying air flow and an imbalance between the supply and exhaust air flows, the blown air loses the ability to flow in a straight-line path towards the film surface and becomes prone to be dragged over in the running direction of the film. Once this situation develops, the MD flow increases, and the blowing nozzles fail to fulfill their heating performance potential. To maintain the heating performance under this condition, it becomes necessary to increase the flow rate of blown air so as to heat the film until the temperature needed for stretching, etc. is reached, leading to an increase in electricity consumption by the heat exchanger.

Known methods aimed at solving the above problem include one that increases the flow rate of blown air along the edges of the film compared to the middle to reduce the temperature unevenness in the width direction of the film (JP 05-096619 A) and one that controls the heat exchanger according to temperatures detected by temperature sensors to evenly heat the film in the width direction and thus reduce temperature unevenness in the width direction (JP 10-249933 A or JP 2002-018970 A).

Known air blowing nozzles that are relatively immune to the influence of the MD flow include a perforated panel-type air blowing nozzle that comprises a number of circular holes provided over the air blowing surface in an array pattern to circumvent the influence of the MD flow by dispersing the air leaving the air blowing surface (JP 2009-255511 A).

There is also a method to suppress the fluttering of a sheet by employing a nozzle featuring a flat section and adjoining sloped sections that is designed to blow parallel flows of air onto the surface of the sheet. That method is known to have an effect of suppressing the heat inflow and outflow at the entrance and exit of the heat treatment chamber by allowing the gap between the sheet and the nozzle to be narrowed (JP 2005-008407 A).

A method to minimize the unevenness of the width direction distribution of heat transfer efficiency by employing an air blowing nozzle comprising multiple circular holes is also known. The air blowing holes are arranged in two rows, at an identical interval Py in each row but in a staggered fashion between the rows. The first and second rows are spaced at interval Px. The air blowing surface and the sheet running plane face each other across distance L, and the air blowing holes on the air blowing surface have diameter D. Intervals Px and Py, distance L and diameter D satisfy the following formula (1): $5 \leq (L/D)/(Px/Py) \leq 9$ and formula (2): $4 \leq L/D \leq 8$ (WO 2008/114586 A1).

However, although the methods described in JP 05-096619 A, JP 10-249933 A and JP 2002-018970 A are effective in cases where air circulation is self-contained inside each individual chamber, has no temperature equalizing effect against the temperature unevenness caused to a certain chamber by an inflow of air from the adjoining chamber with a different temperature setting from the temperature setting of the certain chamber.

The method described in JP 2009-255511 A, which adopts a perforated panel-type air blowing nozzle, is prone to develop an temperature unevenness attributable to the distribution of blowing holes, making it necessary to optimize the blowing hole arrangement pattern, namely the hole diameter, hole interval in the running direction of the film, hole interval in the width direction of the film, number of rows, and the like. For this reason, it incurs large monetary and time costs from the designing of the arrangement pattern of the blowing holes of the air nozzle to its application to production.

The method described in JP 2005-008407 A aims to primarily ensure a stable running of the film and is not specifically targeted at the heating, cooling or drying function of a tenter oven. Namely, it is only useful as a supplementary measure to secure the full capability of the film heating (or cooling or drying) nozzles in a tenter oven, so that the MD flow reduction effect, as such, of the nozzle described in JP 2005-008407 A is small.

When a nozzle of the design described in JP 2005-008407 A is installed to face the upper face of the film passing plane, along with another facing the lower face of the film passing plane, the effect of the method described in JP 2005-008407 A to suppress film fluttering cannot be obtained due to an interference between the Coanda effect brought about by the nozzles, namely the film run stabilization effect afforded by the air blowing pressure and suction force, that is present above the film passing plane and the same effect that is present below the film passing plane. For this reason, JP 2005-008407 A specifies that the nozzle described should be installed only on one side of the film passing plane.

Just as the method described in JP 2009-255511 A, the method described in WO 2008/114586 A1 has an effect of making the blown air relatively immune to the influence of the MD flow that flows across the tenter oven, but it does not have any effect of completely shutting down the MD flow. For this reason, concern remains as to the occurrence of unevenness in physical properties in the width direction of the film or an increase in tenter oven energy consumption as a result of the MD flow.

It could therefore be helpful to reduce the temperature unevenness of the film and make it possible to manufacture a stretched thermoplastic resin film with uniform characteristics and thickness in the width direction by suppressing the MD flow generated inside the tenter oven, as well as providing a tenter oven capable of reducing the energy consumption needed to heat the film to a predetermined temperature and maintain it at that temperature.

SUMMARY

We focused on the distance from an air blowing surface of an air blowing nozzle to a film passing plane and discovered configurations of a tenter oven capable of suppressing the generation of an MD flow.

We thus provide a tenter oven as described below.

A tenter oven having an entrance for a running film composed of a thermoplastic resin at one end thereof and an exit for the running film at the other end thereof, in which a plurality of air blowing nozzles blow heated air to the running film is provided such that at least one of the air blowing nozzles faces the upper face of a passing plane of the running film which is formed all the way from the entrance to the exit and at least another one of the air blowing nozzles faces the lower face of the passing plane of the running film, wherein an air outlet for blowing the heated air out is provided in each of the air blowing nozzles on an air blowing surface thereof facing the film passing plane and a stretching zone for stretching the running film in the width direction thereof is provided at a position between the entrance and the exit; and wherein at least one of the plurality of air blowing nozzles is a proximate nozzle in which the air outlet provided on the air blowing surface is formed with a slit being elongated in the width direction of the film and satisfying the formula: $(L/B) \leq 10$, wherein L is the distance between the air blowing surface and the film passing plane; B is the slit width in the running direction of the film; and the distance L is 150 mm or less.

It is preferable that at least one of the plurality of proximate nozzles is installed to face the upper face of the film passing plane, and at least another is installed to face the lower face of the film passing plane.

It is preferable that the air blowing surfaces of at least a pair of proximate nozzles, one installed to face the upper face of the film passing plane and the other installed to face the lower face of the film passing plane, face each other across the film passing plane.

It is preferable that the air blowing angle formed between the film passing plane and the flow direction of air blown out of the slit of the proximate nozzle towards the film passing plane is 85 to 95°.

It is preferable that a preheating zone that preheats the running film is provided at the side of the entrance in the stretching zone and the proximate nozzles is provided at at least part of the preheating zone.

It is preferable that at least one of the proximate nozzles comprises a housing and the housing has a flow path for the heated air supplied form a supply source therein and the air blowing surface on one of the faces thereof, and wherein the housing comprises a fixed housing and movable housings provided at either end of the fixed housing, and the movable housings are capable of moving in the width direction of the running film to the fixed housing.

It is preferable that left and right clip moving devices are provided to move a number of clips holding both edges of the running film from the entrance to the exit and left and right rails are provided to guide the left and right clip moving devices, and wherein the rails are installed to allow the distance therebetween in the width direction of the running film to be changed and left and right rail covers are provided for covering the left and right rails, and further wherein each of the movable housings are joined to the closer of the pair of rail covers via a coupler to be rendered movable in the width direction of the running film by the coupler according to a change of the distance between the left and right rails. A "rail cover" is a term that collectively refers to all the parts that are installed to cover a rail and moves in the width direction of the running film as an integral whole with the rail.

It is preferable that at least one of the proximate nozzles has a protective cover being installed along one or both sides of the slit to prevent the running film from coming into contact with the edge of the proximate nozzle.

We also provide a stretched film manufacturing method as described below.

A stretched film manufacturing method comprises the steps of:

introducing an unstretched or uniaxial stretched film of a thermoplastic resin as a running film into any of the tenter ovens of the invention described above from the entrance thereof.

heat-treating the film in the tenter oven with the heated air blown out from the one or more slit nozzles and stretching the running film in the width direction thereof during the heat-treating, and drawing out a stretched film from the exit.

Examples of a thermoplastic resin constituting a thermoplastic resin film that may be fed to a tenter oven include the following:

Polyolefin resins, such as polyethylene, polypropylene and polymethylpentene, polyamide resins, such as nylon 6 and nylon 66, polyester resins, such as polyethylene terephthalate, polybutylene terephthalate, polyethylene-2,6-naphthalate, polymethylene terephthalate, polyethylene-p-oxy benzoate and poly-1,4-cyclohexylene dimethylene terephthalate, copolymerized polyesters containing, as copolymerization components, a diol component, such as a diethylene glycol, neopentyl glycol or polyalkylene glycol, and a dicarboxylic acid component, such as adipic acid, sebacic acid, phthalic acid, isophthalic acid or 2,6-naphthalene dicarboxylic acid, polyacetal resins, polyphenylene sulfide resin, and so on.

To obtain the advantageous effect more thoroughly, films made of a polyolefin resin, polyamide resin and polyester resin are preferable. Of them, films made of a polyethylene-2,6-naphthalate resin and polyethylene terephthalate resin are particularly preferable, with films made of a polyethylene terephthalate resin exhibiting a high applicability with wide ranging applications because of their inexpensiveness. These thermoplastic resins may be a homogeneous resin or a copolymerized or blended resin.

In addition to the thermoplastic resins mentioned above, thermoplastic resin films may contain various generally known additives, including, for instance, an antioxidant, antistatic agent, crystal nucleating agent, inorganic particles, viscosity reducing agent, thermal stabilizer, and lubricant.

Our tenter ovens make it possible to reduce the temperature unevenness in the width direction of the film generated inside it and manufacture a stretched thermoplastic resin with uniform characteristics and thickness as it is able to ensure the uniformity of the temperature of blown air by suppressing the generation of the MD flow. This, in turn, makes it possible to improve product quality and increase productivity based on a reduction in film tearing inside the tenter oven.

We also make it possible to reduce the heat exchanger steam consumption associated with air reheating as it is capable of maintaining the temperature of the circulating air at levels close to the temperature setting of the chamber. We are further able to reduce heat exchanger air flow and electricity consumption by improving the heating efficiency of air blowing nozzles.

BRIEF DESCRIPTION OF THE DRAWINGS

FIG. 4b is a magnified transverse cross-sectional schematic diagram of the air outlet T of the proximate nozzle illustrated in FIG. 4a.

FIG. 14b is a plan view schematic diagram of the proximate nozzles illustrated in FIG. 14a.

REFERENCE SIGNS LIST

Figure 1:
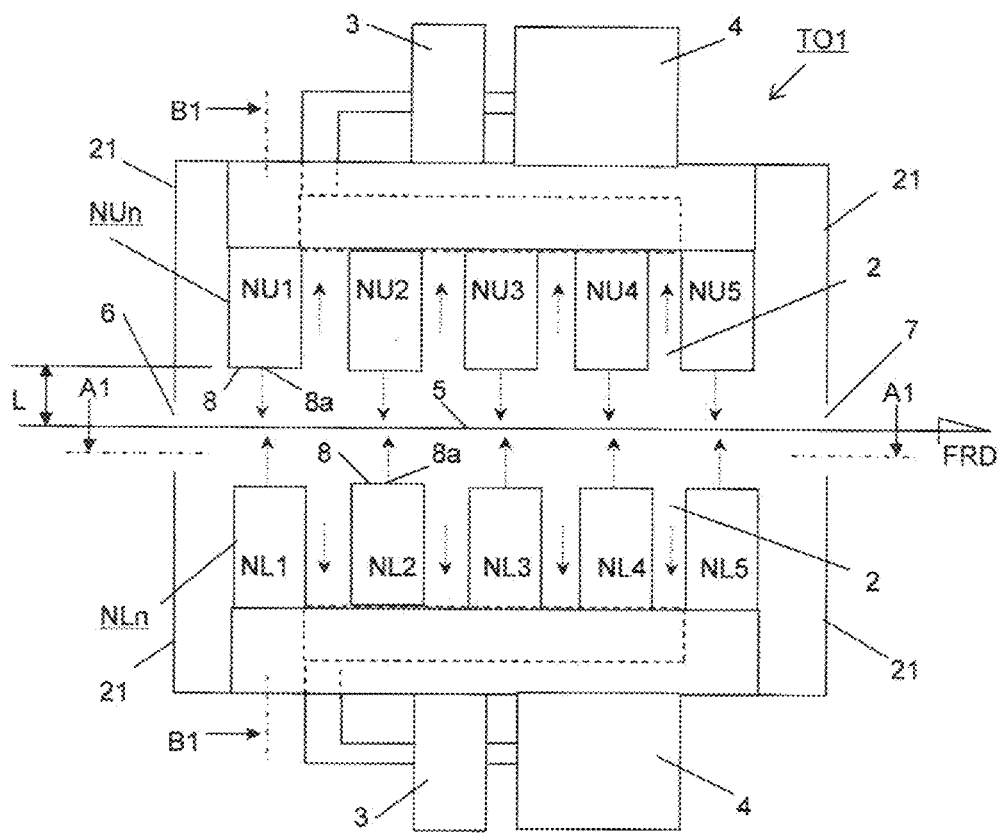
FIG. 1 is a longitudinal cross-sectional schematic diagram of an example of a tenter oven.

2: Air suction space
3: Heat exchanger
4: Circulation fan
5: Film passing plane
6: Entrance (running film entrance)
7: Exit (Running film exit)
8: Air blowing surface
8a: Air outlet, slit
11: Clip
12: Rail
13: Rail cover
14: Fixed nozzle element
15: Movable nozzle element
17: Acrylic plate
18: Exterior wall of model testing machine
19: Vane anemometer
20: Air generator
21: Oven exterior wall
22: Air blowing angle
23: Flow direction of air blown out of slit
24: Cross section of nozzle
25: Center line of nozzle
26: Rail spacing
27: Joint between rail cover and movable nozzle element for rail pattern A
27a: Elongated hole
28: Joint between rail cover and movable nozzle element for rail pattern B
29: Rail end anchor 30: Movement extent of joint in MD direction
31: Pin mechanism linking rail cover and movable nozzle element
31a: Arm
31b: Pin
32: Connective rib
33: Width of connective rib
34: Distance between two adjacent connective ribs
35: Interval between adjacent holes in perforated panel-type air blowing nozzle
36: Opening area of hole in perforated panel-type air blowing nozzle
37: Section with uneven blown air distribution due to overlapping of fixed nozzle element and movable nozzle element
38: Edge of protective cover designed to prevent film from getting caught on something
39: Movable cover section
40: Fixed cover portion
41: Opening on protective cover
42: Protective cover
B: Slit gap, slit width
FRD: Running direction of film
FWD: Width direction of film
L: Distance from air blowing surface to film passing plane
NUn, NLn: Air blowing nozzle, slit nozzle or proximate nozzle
RPA: Rail pattern A
RPB: Rail pattern B
TO1: Tenter oven
TO2: Tenter oven
ZC: Cooling zone
ZD: Stretching zone
ZHS: Heat setting zone
ZPH: Preheating zone

DETAILED DESCRIPTION

Several examples of our tenter ovens will now be described by referring to the Drawings.

Figure 2:
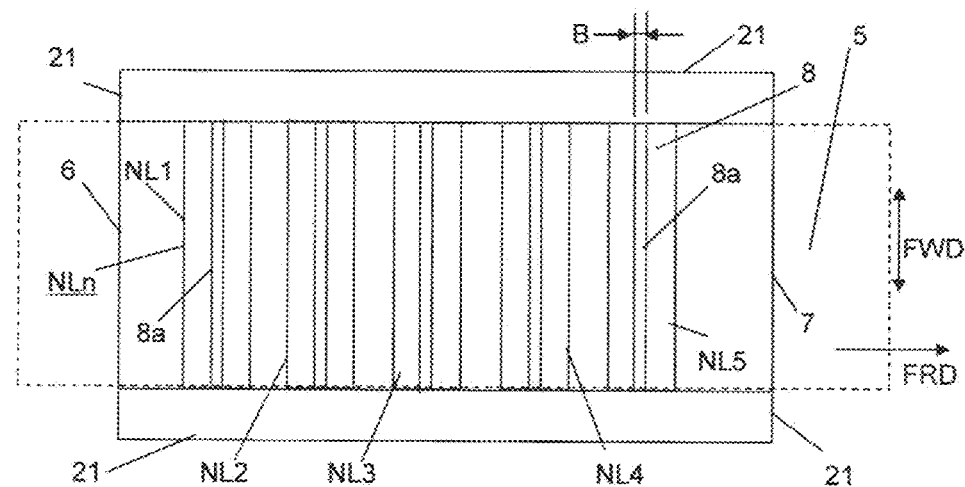
FIG. 2 is a plan view schematic diagram as viewed in the direction indicated by the A1-A1 arrows in FIG. 1.

FIG. 1 is a longitudinal cross-sectional schematic diagram of an example of a tenter oven. FIG. 2 is a plan view schematic diagram as viewed in the direction indicated by the A1-A1 arrows in FIG. 1. In FIG. 1, a tenter oven TO1 has an entrance 6 for a running film, constituted by a thermoplastic resin film, at one end of it and an exit 7 for it at the other end, as well as a film passing plane 5 formed all the way from the entrance 6 to the exit 7.

Above the film passing plane 5, a series of five upper air blowing nozzles NUn (n=1 to 5) are provided from the entrance 6 to the exit 7, namely in the running direction of the film, at regular intervals. An air blowing surface 8 of each of the air blowing nozzle NUn faces the film passing plane 5 at a certain distance.

Also, below the film passing plane 5, a series of five lower air blowing nozzles NLn (n=1 to 5) are provided from the entrance 6 to the exit 7, namely in the running direction of the film, at regular intervals. An air blowing surface 8 of each of the air blowing nozzles NLn faces the film passing plane 5 at a certain distance.

In general, each of the air blowing nozzles is formed with a housing. The housing has a flow path for heated air supplied from a supply source therein, while one of its faces accommodates the air blowing surface 8, lying along the length direction of the housing (i.e. the width direction of the running film).

Each of the air blowing surfaces 8 of the air blowing nozzles NUn and NLn features an air outlet 8a designed to blow out heated air. Each air outlet 8a is configured as a slit. Hereinafter, an air blowing nozzle having an air outlet configured as a slit 8a will be referred to as a slit nozzle.

It is preferable that the interior of the tenter oven TO1 is divided into two or more zones with different film treatment objectives from the film entrance 6 to the film exit 7, namely in the running direction of the film.

Zones with different film treatment objectives in the tenter oven refer to zones corresponding to film treatment steps designed to provide a film with preheating, stretching, heat-treating, cooling and other treatments, and each step is also generally referred to as a preheating zone, stretching zone, heat treatment zone, cooling zone, or the like. When the tenter oven is divided into two or more zones, it is preferable that the zone located closest to the entrance 6 is a preheating zone.

Although zones are sometimes set up in a single treatment chamber without any partitions to divide individual zones, they are, as a general rule, separated into two or more treatment chambers distributed across the tenter oven from the entrance 6 to exit 7 for the running film, namely in the running direction of the film, so that the temperature setting of each treatment chamber can be individually changed. A treatment chamber in the tenter oven means a space completely enclosed with walls except for openings provided to pass a running film and openings provided, as necessary, to allow heated air to be supplied and discharged.

The slit nozzle NUn or NLn is a nozzle designed to blow hot air (heated air) out and heat a film. While running across the treatment chamber from the entrance 6 to exit 7, the film is heated or cooled by heated air blown out of the slit nozzle NUn or NLn according to the treatment objective. When the temperature of the film is higher than the temperature of heated air, the film is cooled by heated air.

An air suction part 2 is provided around the slit nozzle NUn or NLn. Cooled air that has bounced off the film is sucked into the air suction part 2 and gets to a heat exchanger 3 attached to the tenter oven TO1. After being reheated to the temperature setting in the heat exchanger 3, the air is blown out of the slit nozzle NUn or NLn again via a circulation fan 4.

The flow of air ejected from the slit nozzle NUn or NLn consists of a potential core, a region in which the initial wind speed is maintained and a turbulent region, a non-potential core region in which the air flow rate decreases as a result of the dragging along of the surrounding stationary air. The air that has exited the air outlet (slit) 8a provided on the air blowing surface 8 of the slit nozzle NUn or NLn experiences a progressively larger fall in wind speed in the potential core as it gets closer to the film passing plane 5, and this leads to the development of a turbulent region.

For this reason, the longer the distance between the film passing plane 5 and the air blowing surface 8, the more likely an MD flow is generated because the blown air more easily loses stability as a result of the weakening of its ability to flow in a straight line in the face of a running film-induced air flow and other external disturbances. Consequently, the film heating efficiency of the slit nozzle NUn or NLn tends to decrease.

The air blowing surface 8 is the surface of the slit nozzle NUn or NLn from which air is blow out and is the face of the slit nozzle NUn or NLn. The film passing plane 5, on the other hand, is a plane described by a running film.

As a method to suppress generation of an MD flow, an increase in the wind speed of the blown air easily comes to mind. However, even if the wind speed of the blown air is increased, it is difficult to fundamentally suppress generation of an MD flow, as long as the distance from the air blowing surface 8 to the film passing plane 5 remains large. For the length or strength of the potential core depends on the size of the air outlet (slit) 8a on the air blowing surface 8, making it impossible to ensure the stability of blown air by just increasing its wind speed.

Where the size of the air outlet (slit) 8a is constant, increasing the wind speed means increasing the flow rate of blown air, so that it is prone to cause an MD flow by increasing the running film induced air flow, which flows right over the film surface. Further, an increase in the air flow rate causes the energy (steam or electricity) consumption of the tenter oven to increase.

Given that the ability for the potential core of the blown air to maintain a straight line path is influenced by the gap B that the slit 8a on the air blowing surface 8 has in the running direction of the film (slit width B) in FIG. 2, the distance L from the air blowing surface 8 to the film passing plane 5 and the slit width B need to satisfy the formula: $(L/B) \leq 10$ to suppress the generation of an MD flow. It is preferable that the distance L and the slit width B satisfy the formula: $(L/B) \leq 5$. If the distance L is 150 mm, it is preferable that the slit width B is 15 mm or less, and, in this case, the distance L and the slit width B can satisfy the formula: $(L/B) \leq 10$.

Though there are no specific restrictions on the lower limit of the value of (L/B), it is preferable that the distance L and the slit width B satisfy the formula: $2 \leq (L/B)$, given that the lower limit of the distance L is practically about 30 mm against the slit width B of about 15 mm or less, taking in to consideration maintainability, ease of work, and the like.

The slit width B is the length (width) in the running direction of the film of the outlet on the air blowing surface 8 when the outlet has a slit shape.

As a method to more effectively suppress generation of an MD flow, it is preferable that the distance L from the air blowing surface 8 of the slit nozzle NUn or NLn to the film passing plane 5 is set to 150 mm or less.

Setting the distance from the air blowing surface 8 to the film passing plane 5 at 150 mm or less brings the potential core of the blown air closer to the film passing plane 5 and enables it to function as a powerful air curtain against the MD flow. It is therefore preferable that the distance L from the air blowing surface 8 to the film passing plane 5 is set to 150 mm or less with at least one slit nozzles among all slit nozzles NUn and NLn installed inside the given treatment chamber or treatment zone.

Hereinafter, any slit nozzle NUn or NLn whose distance from the air blowing surface 8 to the film passing plane 5 is 150 mm or less will be referred to as a proximate nozzle NUn or NLn.

This further improves the film heating efficiency of the proximate nozzles NUn and NLn by further improving the ability of the blown air to flow in a straight line path or its stability, not to mention the suppression of the MD flow. Further, suppression of the MD flow also makes it possible to further reduce the temperature unevenness occurring to the film, as well as the steam consumption associated with the heating of the circulating air to the temperature setting of each treatment chamber.

If, on the other hand, the distance L from the air blowing surface 8 to the film passing plane 5 exceeds 150 mm, the blown air becomes prone to lose its ability to flow in a straight line path, leading to a reduction in the MD flow suppression effect and a fall in the film heating efficiency of air blowing nozzles.

Further, it is more preferable that the distance L from the air blowing surface 8 to the film passing plane 5 of a proximate nozzle is 75 mm or less. This improves the MD flow suppression effect and film heating efficiency by allowing the potential core of blown air to reach the film passing plane 5 while maintaining its ability to flow in a straight line path.

It is even more preferable that the distance L from the air blowing surface 8 to the film passing plane 5 of a proximate nozzle is 50 mm or less. This further improves the film heating efficiency.

Normally, a tenter oven for thermoplastic resin films has a distance from the air blowing surface to the film passing plane of 170 mm to 300 mm. However, it has been discovered that reducing this distance, for instance, from 170 mm to 50 mm improves the film heating efficiency by 20 to 30%.

Proximate nozzles make it possible to reduce electricity consumption by lowering the air flow rate of the circulation as a benefit from the improvement in the film heating efficiency. In this case, it is advisable that the air flow rate of the circulation fan be lowered while making sure that the application of proximate nozzles does not change the characteristics and quality of the film compared to what they were prior to this.

When there is a slack in the running film, the blown air causes the film to flap up and down in a phenomenon called fluttering. For this reason, if the distance L from the air blowing surface 8 to the film passing plane 5 is made too small, the running film becomes susceptible to tearing as a result of coming into contact with the face (air blowing surface) of a proximate nozzle. It is therefore advisable that the lower limit of the distance L from the air blowing surface 8 to the film passing plane 5 is set within a range in which the running film does not come into contact with the air blowing surface 8 of a proximate nozzle.

We confirmed that, with the range set in the examples to be described later, a stretched film can be manufactured without allowing the running film to come into contact with a proximate nozzle. It is possible to shorten the distance L further by refining the process, in terms of, for instance, cutting the slack in the running film.

Conversely, it is also preferable that to protect the running film from tear even if the running film gets caught on the face of a proximate nozzle (air blowing surface) as a result of fluttering attributed to, for instance, an imbalance in blown air inside the tenter oven, the faces of proximate nozzles be processed to make it free of sharp features as much as possible.

In addition to or in place of smoothly processing the faces of proximate nozzles, protective covers may be installed near the faces of proximate nozzles in the length direction of proximate nozzles (width direction of the running film) to prevent the film from getting caught on something. Possible shapes of a protective cover include a rod and plate. In the case of a plate-shaped cover, a single cover may be placed over the space between each pair of adjacent proximate nozzles.

When the protective cover is formed of a single plate placed over the space between each pair of adjacent proximate nozzles, such a plate needs to feature air holes capable of passing exhaust air through. This is because of the need to secure a flow path for the exhaust air to be delivered to the heat exchanger 3 attached to the tenter oven via the air suction part 2 formed between adjacent proximate nozzles.

Figure 14A:
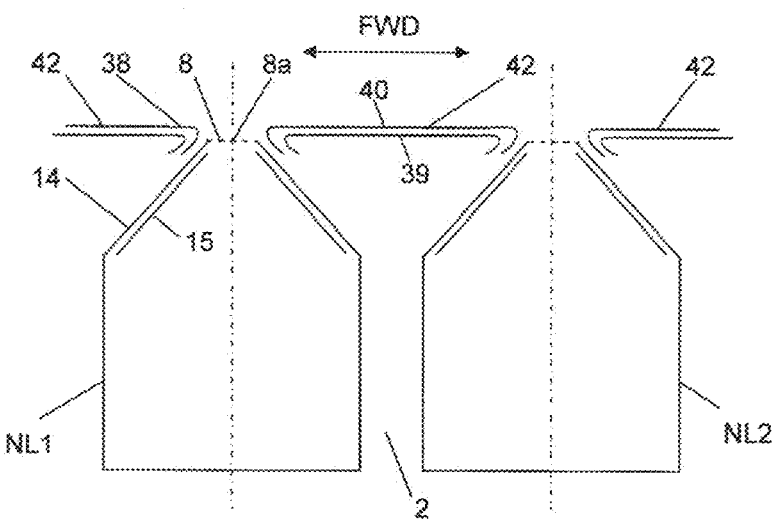
FIG. 14a is a transverse cross-sectional schematic diagram of an example of adjacent proximate nozzles used as air blowing nozzles of a tenter oven whose length in the width direction of the running film is variable when protective covers are used near the air outlets (slits) of such proximate nozzles to prevent the running film from getting caught on the edge of a proximate nozzle.

An example of installing protective covers designed to prevent a running film from getting caught on something near the faces of proximate nozzles is described in FIG. 14a. FIG. 14a is a transverse cross-sectional schematic diagram of an example of adjacent proximate nozzles used as air blowing nozzles of a tenter oven whose length in the width direction of the running film is variable when protective covers are used near the air outlets (slits) of such proximate nozzles to prevent the running film from getting caught on the edge of a proximate nozzle.

In FIG. 14a, the proximate nozzles NL1 and NL2 are both proximate nozzles whose length in the width direction of the running film is variable. Each of them comprises a fixed nozzle part (fixed housing) 14 and a pair of movable nozzle parts (movable housings) 15, which are telescopically extendable against the fixed nozzle part (fixed housing) 14. Protective covers 42 are provided near the air blowing surfaces 8 of the proximate nozzle NL1 and NL2 to prevent the running film from getting caught on the edge of a proximate nozzle.

It is preferable that the edge 38 of the protective cover 42 be positioned closer to the film passing plane 5 than the air blowing surface 8 of the proximate nozzle NL1. It is also preferable that sharp elements be removed from the protective cover 42 by, for instance, bending its ends. Positioning the edge 38 of the protective cover 42 closer to the running film (film passing plane 5) than the air blowing surface 8 of the proximate nozzle NL1 makes it possible to prevent film tearing due to contact with the top face of a proximate nozzle by, if necessary, letting the running film come into contact with the protective cover 42, rather than the top face of the proximate nozzle NL1.

When air blowing nozzles are proximate nozzles, it is advisable that, to ensure nozzle maintainability, ease of cleaning, and the like, the distance from the air blowing surface 8 of an upper-side proximate nozzle NUn, located above the film passing plane 5, and the air blowing surface 8 of the corresponding lower-side proximate nozzle NLn, located below the film passing plane 5, be set to 50 mm or more to secure adequate work space. In other words, it is preferable that the distance L from the air blowing surface 8 to the film passing plane 5 L is set to 25 mm or more.

When using a proximate nozzle, it is preferable that it be positioned such that its air blowing surface 8 faces the film passing plane 5. When providing a proximate nozzle above and below the film passing plane 5, it is preferable that the air blowing surfaces 8 of the two proximate nozzles face each other directly with the film passing plane 5 interposed therebetween.

If a proximate nozzle is installed only above or below the film passing plane 5, the MD flow tends to occur more easily on the side where the proximate nozzle is not installed, thus reducing the MD flow suppression effect of a proximate nozzle.

Unlike cloth or other similar materials, a thermoplastic resin film is virtually impervious to air. If, therefore, air is blown onto a film from only above or below, the wind pressure generated by it pushes the film up, and amplifies its fluttering. This is a potential cause of film tearing and other problems. It also makes it difficult to uniformly heat, cool or dry both sides of the film, and the film is prone to develop unevenness in physical properties.

For this reason, it is advisable to provide a device (e.g., a presser roll) to prevent film fluttering on the side opposite to the one onto which air is blown. However, a preferable way to prevent film fluttering is to install a proximate nozzle both above and below the film passing plane 5 in such a manner as to face the film passing plane 5, and it is more preferable that the air blowing surface of the upper-side proximate nozzle and the air blowing surface of the lower-side proximate nozzle face each other.

Two air blowing surfaces facing each other is a state in which the image of the air blowing surface of the upper-side proximate nozzle as projected on to the film passing plane 5 and the image of the air blowing surface of the lower-side proximate nozzle as projected on to the film passing plane 5 at least partially overlap each other. It is more preferable that the two projected images completely overlap.

Such a state, when the number of upper or lower-side proximate nozzles is n, is further described below. Namely, it is preferable that n proximate nozzles be installed above the film passing plane, that n proximate nozzles be also installed below the film passing plane 5, and that the air blowing surfaces of all proximate nozzles be positioned to face the film passing plane 5, and it is more preferable that the air blowing surfaces of each pair of upper and lower-side proximate nozzles face each other.

There are no specific restrictions on the upper limit of n, the number of upper or lower-side proximate nozzles, as long as it is an integer greater than 0. However, n may, as a general rule, be selected from the 1 to 300 range.

To adequately suppress the MD flow and secure a capacity to heat, cool or dry a film, it is preferable that the air blowing angle, the angle formed by the flow direction of the air blown out of the slit of a proximate nozzle and the film passing plane 5, be vertical. The air blowing angle being vertical means that the angle formed by the flow direction 23 (see FIG. 3b) of the air blown out of the slit of a proximate nozzle and the film passing plane 5 falls within the 90±5° range.

Figure 3A:
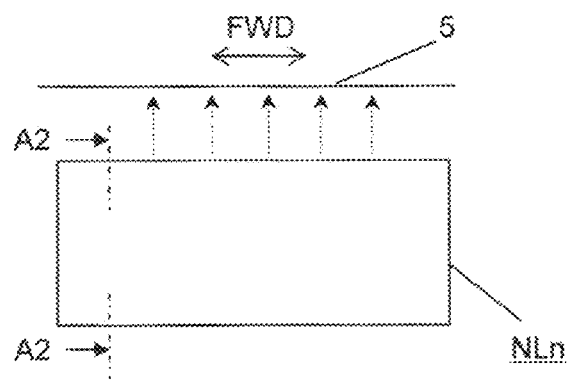
FIG. 3a is a longitudinal cross-sectional schematic diagram of a proximate nozzle used as an air blowing nozzle of a tenter oven that describes the flow direction of air blown out of a slit provided on an air blowing surface of the proximate nozzle towards a film passing plane.
Figure 3B:
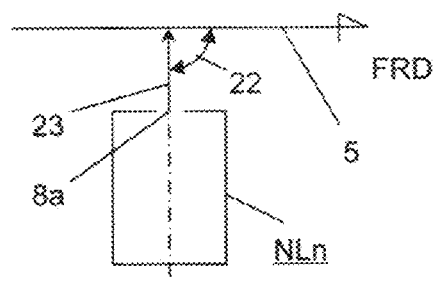
FIG. 3b is a transverse cross-sectional schematic diagram of the proximate nozzle illustrated in FIG. 3a as viewed in the direction indicated by the A2-A2 arrows that describes an air blowing angle formed by the flow of the air blown out of the slit of the proximate nozzle towards the film passing plane and the film passing plane.

This relationship is described using FIGS. 3a and 3b. Namely, it does not mean that the air blowing angle 22 as illustrated in FIG. 3b is not vertical if it misses 90° even by 1°. It is common that the air blowing angle 22 sometimes slightly falls off the 90° mark due to dimensional errors involved in the installation of proximate nozzles. It is therefore preferable that the air blowing angle 22 be in the 90±5° range, more preferably in the 90±2° range.

Although the air blowing angle can be either the downstream-side angle (angle 22 in FIG. 3b) with respect to the running direction of the film or the upstream-side angle with respect to the running direction of the film, the air blowing angle, refers to the downstream-side angle with respect to the running direction of the film (angle 22 in FIG. 3b).

In a tenter oven, the MD flow suppression effect can be obtained by bringing the potential core of blown air as close to the film passing plane 5 as possible to form a powerful air curtain against the MD flow. It is therefore preferable that the wind pressure generated by the blown air on the film surface be high. To this end, it is preferable that the blown air hit the film passing plane 5 vertically.

If the air blowing angle 22 falls outside the 90±5° range, the blown air hits the film surface (top or bottom), which coincides with the film passing plane 5, obliquely, and loses the ability to flow in a straight line path towards the film surface due to the running film induced air flow, present on the film surface, and other external disturbances, leading to the generation of an MD flow. This, in turn, gives rise to problems such as unevenness in physical properties in the width direction of the film and an increase in energy consumption.

Figure 4A:
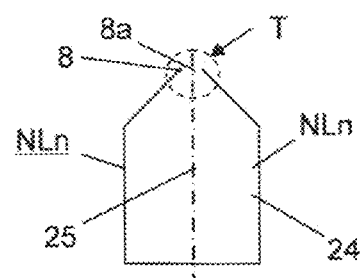
FIG. 4a is a transverse cross-sectional schematic diagram of an example of a proximate nozzle used as an air blowing nozzle of a tenter oven.

To keep the air blowing angle 22 vertical to the film passing plane 5, it is preferable that the shape of the air flow path in the cross section of the proximate nozzle NUn or NLn in the running direction of the film (longitudinal cross section), namely, in the cross section (transverse cross section) 24 in the direction perpendicular to the length direction of the nozzle is symmetrical with respect to the nozzle center line 25 as illustrated in FIG. 4a.

Figure 4B:
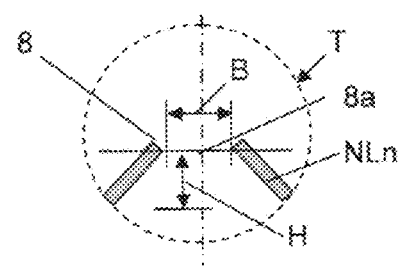

FIG. 4b is a magnified transverse cross-sectional schematic diagram of the air outlet T of the proximate nozzle illustrated in FIG. 4a. It is preferable in the cross section of the nozzle air outlet T illustrated in FIG. 4b that the cross-sectional shape of the air flow path inside the nozzle is symmetrical within the range where the slit gap (slit width) B of the air outlet (slit) 8a on the air blowing surface 8 and the distance H in the direction to the bottom from the air blowing surface 8 satisfy the formula: $(H/B) \leq 10$. When for instance, the slit gap B is 10 mm, it is more preferable that the cross-sectional shape of the air flow path inside the nozzle is symmetrical in a condition that the formula: $H \leq 100$ mm is satisfied.

Figure 5:
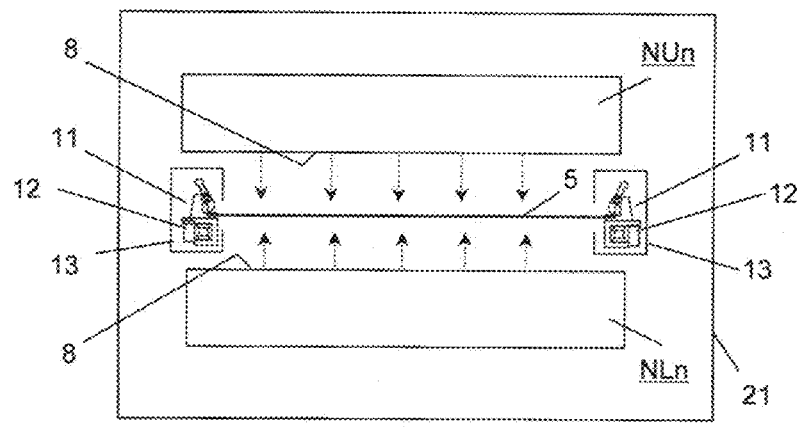
FIG. 5 is a transverse cross-sectional schematic diagram as viewed in the direction indicated by the B1-B1 arrows in FIG. 1.
Figure 6:
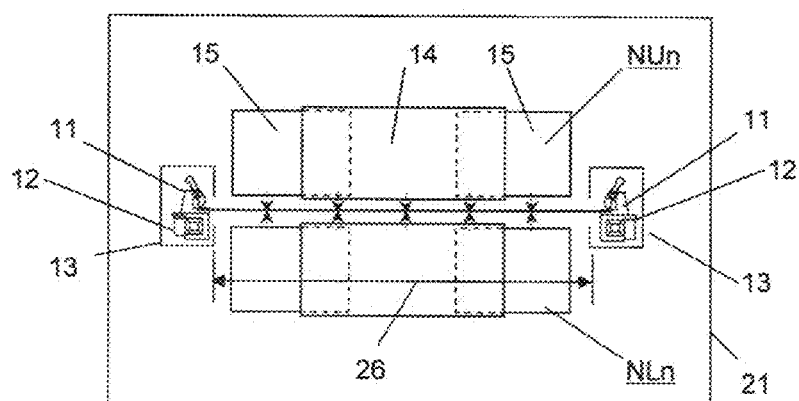
FIG. 6 is a transverse cross-sectional schematic diagram as viewed in the direction indicated by the B1-B1 arrows in FIG. 1 when proximate nozzles comprising a fixed housing and movable housings are used.

FIG. 5 is a transverse cross-sectional schematic diagram of the tenter oven illustrated in FIG. 1 as viewed in the direction indicated by the B1-B1 arrows. FIG. 6 is a transverse cross-sectional schematic diagram of a tenter oven in case where each of the proximate nozzles illustrated in FIG. 5 comprises a fixed housing and movable housings.

In the tenter oven illustrated in FIG. 5, the air blowing surfaces 8 of a pair of proximate nozzles NUn and NLn are positioned above and below the film passing plane to face the film passing plane 5. In this tenter oven, left and right clip moving devices, designed to move a number of clips 11 provided to hold both edges of the film from the entrance 6 to the exit 7, left and right rails 12, designed to guide those left and right clip moving devices and installed to allow the distance therebetween in the width direction of the running film to be changed, and left and right rail covers 13, designed to cover those left and right rails.

If the rail cover 13 and the proximate nozzles NUn and NLn interfere with each other, making it impossible to bring the distance from the air blowing surface 8 to the film passing plane 5 close to the 150 mm or less range, the length of the proximate nozzles NUn and NLn in the width direction of the running film may be made shorter than the distance between the pair of rail covers 13 so that the proximate nozzles NUn and NLn fit in the distance available between the pair of rail covers 13.

FIG. 6 is a transverse cross-sectional schematic diagram of a tenter oven when the air blowing surfaces 8 of the proximate nozzles NUn and NLn are positioned above and below, respectively, of the film passing plane 5 in such a way as to face the film passing plane 5. Using FIG. 6, an example of the configuration of a proximate nozzle designed to accommodate the changing of the distance between the pair of rails 12 in the width direction of the running film interval (rail spacing) 26 will now be described.

The proximate nozzles NUn and NLn illustrated in FIG. 6 are proximate nozzles whose length in the width direction of the running film can be changed (extendable) in response to a change in rail spacing 26. The example of the proximate nozzles NUn and NLn, as a mechanism to change length in response to a change in rail spacing 26, may comprise a fixed nozzle element 14 and a pair of movable nozzle elements 15, which are telescopically extendable against the fixed nozzle element 14. Each movable nozzle element may itself comprise two or more extendable elements.

In that case, the number of fixed nozzle elements, and that of movable nozzle elements, making up proximate nozzles may be selected according to the variable range of rail spacing 26. Linking the left and right movable nozzle elements 15 to the left and right rail covers 13, respectively, makes responding to the change in rail spacing 26 possible.

Figure 14B:
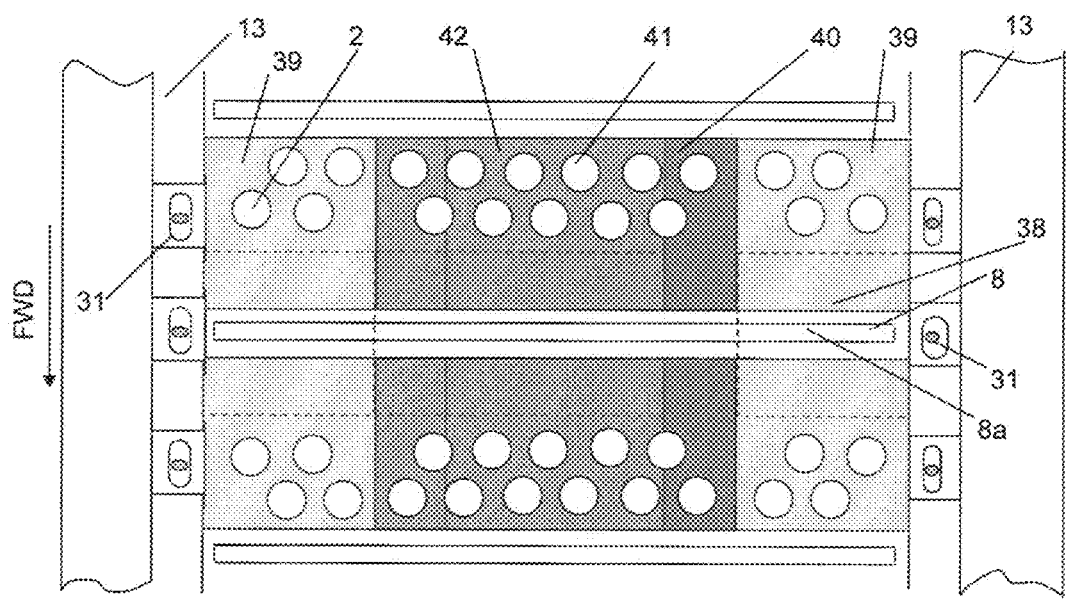

When providing a proximate nozzle whose length is variable in its length direction (width direction of the film) with protective covers designed to prevent a running film from getting caught on something, the protective covers 42 in FIG. 14a must, like the proximate nozzle, change in response to a change in rail spacing. It is therefore preferable that such a protective cover 42 may, for instance, comprise a fixed cover section 40 and a pair of movable cover sections 39, which are telescopically extendable against the fixed cover section 40 as illustrated in FIG. 14b. Linking the end of each movable cover section 39 to its corresponding rail cover 13 makes it possible to respond to the change in rail spacing.

When the protective cover 42 is provided over the return air suction space 2 between each pair of proximate nozzles NUn or NLn that are adjacent to each other in the running direction of the film, the protective cover 42 needs to feature openings so as not to disturb the flow of air through the return air suction space 2. This secures a flow path for the air bouncing off the film surface (return air suction space 2).

The shape of the openings 41 in the protective cover is not limited to numerous circular holes as illustrated is FIG. 14b, and the openings 41 may be designed according to the strength and manufacturing precision of the protective cover 42 in terms of shape, size and arrangement.

Figure 13:
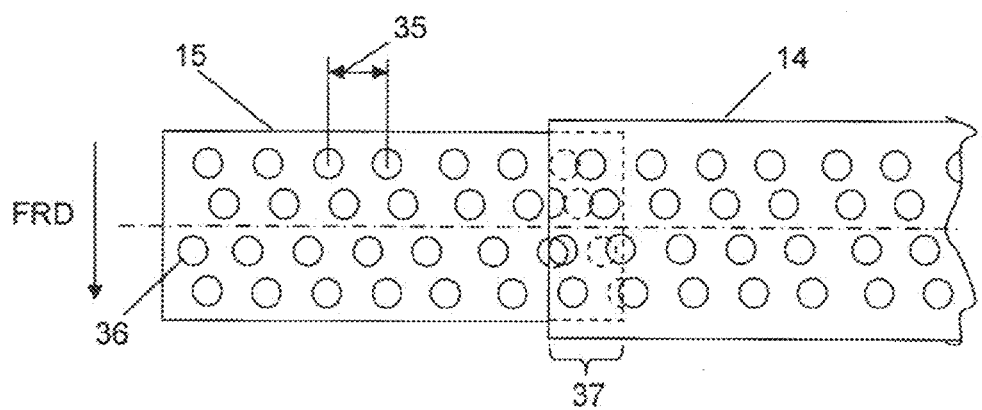
FIG. 13 is a plan view schematic diagram of a section stretching from one end to the middle of a perforated panel-type air blowing nozzle used as an air blowing nozzle of a conventional tenter oven when its length in the width direction of the running film is made variable.

The air outlet pattern of the air blowing surface of a nozzle with a variable length in the width direction of the running film needs to be a slit. This is because, if, as illustrated in FIG. 13, an air blowing nozzle with a porous plate-type air blowing surface is used and this air blowing nozzle comprises a fixed nozzle element 14 and a pair of movable nozzle elements 15, the sections where the fixed nozzle element 14 and a movable nozzle element 15 overlap, as needed to change the length of the air blowing nozzle, always have some holes partially blocked and this makes it difficult to eliminate unevenness in physical properties as a result of the presence of sections with an uneven blown air distribution in the width direction of the film 37 due to a change in the hole interval 35 and reduction in the effective opening area 36.

This problem is solved by changing the air outlet pattern of the air blowing surface to a slit. Namely, even when the nozzle length (length of a nozzle in the direction perpendicular to the running direction of the film) is changed, the slit gap (slit width) of the slit 8a provided along the length of the nozzle is constant in the length direction of the nozzle, so that the occurrence of an unevenness in opening area in the sections where the fixed nozzle element and a movable nozzle element overlap can be avoided. This makes it a reality to manufacture stretched films uniformly having desired physical properties.

In a proximate nozzle comprising a housing having a flow path for heated air therein in which both end parts of the housing in width direction of a running film are extendable in width direction of the running film, it is preferable that a joint portion between the movable nozzle element 15 and the rail cover 13 is capable of absorbing a movement of the rail 12 (or the rail cover 13) in the running direction of the film and freely rotating about both the film running direction and the film width direction.

Figure 11A:
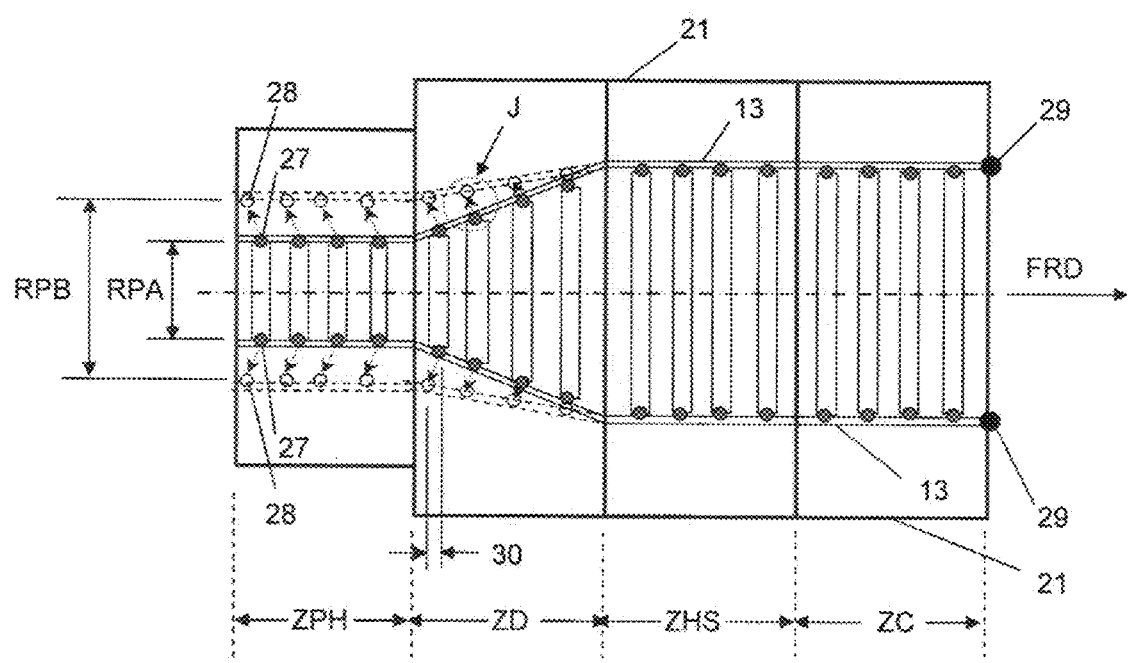
FIG. 11a is a plan view schematic diagram as viewed in the direction indicated by the D1-D1 arrows in FIG. 7 when proximate nozzles with variable lengths in the width direction of the running film are used in all zones of the tenter oven as air blowing nozzles.

As illustrated in FIG. 11a, a tenter oven has a stretching step aimed at stretching the width direction of the film and providing the film with prescribed physical properties. In this regard, changing the distance between the left and right rails is not only needed when switching between products with different widths but also when giving different stretch ratios to a film in the stretching step. For example, when the distance between the left and right rails is changed, the distance between the left and right rails is changed to change the stretching ratio by changing from a rail RPA in a state of one pattern A to a rail RPB in a state of another pattern B, a position of the joint portion 27 of the rail cover 13 and the movable nozzle part 15 in the rail RPA in the state of the pattern A is moved to a position of the joint portion 28 in the rail PRB in the state of the pattern B.

Namely, as the distance between a pair of rails is changed, the joint portion 27 moves in the running direction of the film (MD direction), while the rail cover 13 rotates, in relative terms, with respect to the proximate nozzle. It follows that, if the movable nozzle element 15 and rail cover 13 are rigidly joined, there is a risk that the movement of the rail cover 13 might damage the proximate nozzle. The film stretch ratio may change over the range of about 3 to 7 depending on the required level of product quality, and the shift in the MD direction of the rails may become large.

For this reason, when installing a series of two or more proximate nozzles in the MD direction of a tenter oven, it is preferable that the joint portions 27, 28 have a structure that enables it to freely rotate about both the film running direction and the film width direction, while absorbing a movement extent 30 in the MD direction due to a change in rail spacing. If the nozzle just extends and contracts in the width direction of the film, it is sometimes unable to respond to a change in the stretch ratio.

Figure 11B:
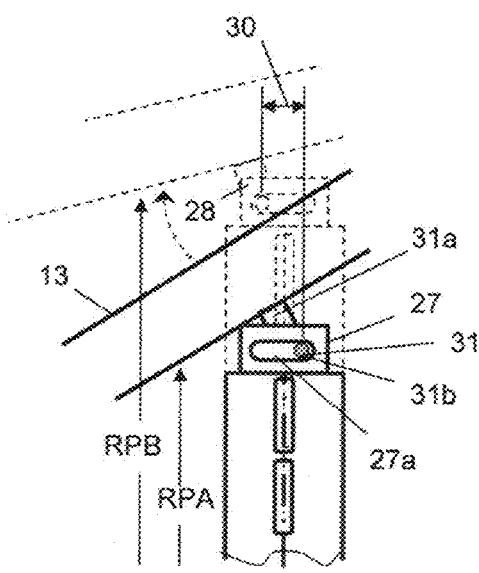
FIG. 11b is a magnified plan view schematic diagram of an end section of the proximate nozzle illustrated in FIG. 11a and a joint with a rail cover.

Possible solutions to achieve the above goal include making a suitable elongated hole in a coupler that is the actual implementation of the joint portion 27 between the rail cover 13 and the movable nozzle element 15 according to the size of rail movement and engaging a pin mechanism 31 in FIG. 11b, link mechanism or the like with that elongated hole. Such a coupler may be obtained by, for instance, fitting a pin 31b, provided at the end of an arm 31a attached to the rail cover 13, into an elongated hole 27a, made in the joint portion 27 provided at the rail-side end of the movable nozzle element of the proximate nozzle to allow movement.

Although it is possible to attach a driving source to the movable nozzle element rather than linking the movable nozzle element and rail cover together, this method will necessitate a measure to avoid damage due to interference between the proximate nozzle and the rail cover, such as a synchronization with the movement of the rail cover.

Figure 12:
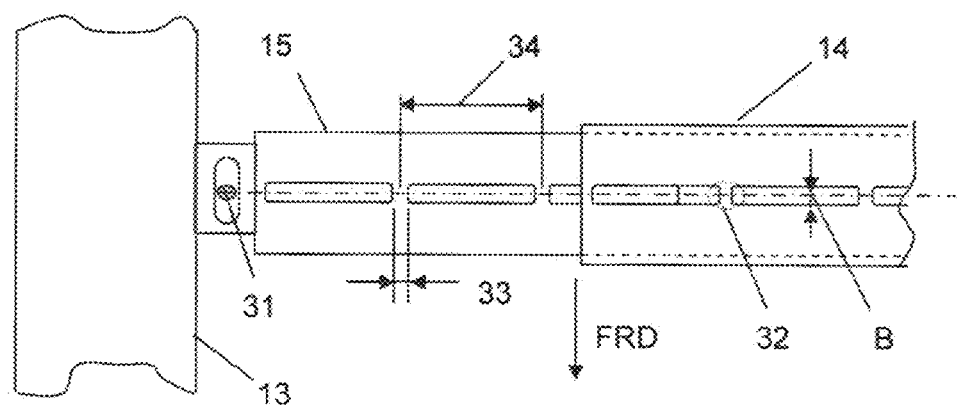
FIG. 12 is a plan view schematic diagram of a section stretching from one end to the middle of an example of a proximate nozzle used as an air blowing nozzle of a tenter oven whose length in the width direction of the running film is variable.

It is preferable that the slit of a proximate nozzle whose nozzle length is variable have connective ribs 32 in FIG. 12 to help retain the slit gap. It is preferable that the width 33 of a connective rib 32 is 2 mm or less and that the distance 34 between two adjacent ribs is 10 mm or more.

If the air blowing surface has a slit-shaped outlet, namely, if it is a slit nozzle or a proximate nozzle, it is preferable that it has a structure that enables it to keep the slit gap constant across the fixed nozzle element and movable nozzle elements to equalize the film heating efficiency in the width direction. This can be realized by provide a connective rib 32 (a reinforcing part to help retain the slit gap) at a constant interval along the slit on the air blowing surface, i.e., in the nozzle width direction as illustrated in FIG. 12.

There is a concern that the presence of the connective ribs 32 may cause an unevenness in heating efficiency by disturbing the air flows occurring in their vicinity. However, this concern can be eliminated by setting the width 33 of a connective rib 32 to 2 mm or less and its thickness in the vertical direction to 2 mm or less. If these ranges are exceeded, concerns may arise over film quality problems such as unevenness in thickness due to large uneven in heating efficiency.

It is preferable that the distance between two adjacent connective ribs 34 is at least 10 mm. Setting the distance 34 to 10 mm or more makes the impact of the connective ribs 32 small in terms of a reduction in flow rate of air flows occurring in their vicinity, thus virtually eliminating any real harm to film quality. There are no specific restrictions on the upper limit of the distance 34, as it depends on the rigidity of the air blowing surface of the nozzle. However, the distance may preferably be 500 mm or less and more preferably 100 mm or less.

The width 33 of a connective rib 32 is its length in the length direction of the slit, while the thickness of a connective ribs 32 is its size in the vertical direction. The distance between two adjacent connective ribs 34 adjacent is the distance between the central points of adjacent ribs.

The shape of a connective rib 32 may be a rectangular parallelepiped, round bar, or the like. However, it is desirable that an optimum specification of a connective rib 32 in terms of shape, placement interval in the width direction of the nozzle, and the like is considered according to the allowable level of film unevenness.

It is preferable that a proximate nozzle whose length is variable be provided with an assisted telescopic mechanism whereby a movable nozzle elements 15 moves against a fixed nozzle element 14.

It is preferable that each movable nozzle element 15 move in the width direction of the film with a low mechanical resistance against the fixed nozzle element 14 to allow the nozzle length to be adjusted as prescribed without collision between the two elements by maintaining a constant gap between them. To this end, an assisted telescopic mechanism designed to assist the movement of the movable nozzle element 15 ought to be provided. Possible examples of such an assisted telescopic mechanism include a combination of wheels attached to the movable nozzle element 15 and a pair of rails attached to the fixed nozzle element 14 to guide the wheels attached to the movable nozzle element 15.

In this regard, the type and structure of an assisted telescopic mechanism are not limited to wheel-assisted rolling, and other methods such as linear guide-assisted sliding and sliding between two metal plates lubricated with a penetrating lubricant, are also possible options. It is advisable to make a choice by taking into consideration maintainability (replenishment of lubricant and inspection and repair of nozzles), costs, mechanical resistance, heat resistance, and so on.

In a tenter oven divided into a series of two or more zones from the entrance 6 towards the exit 7, it is preferable that, when a zone prior to the stretching step is designated as a preheating zone, one or more proximate nozzles be installed in at least part of the preheating zone. The reasons for this are as described below.

Figure 7:
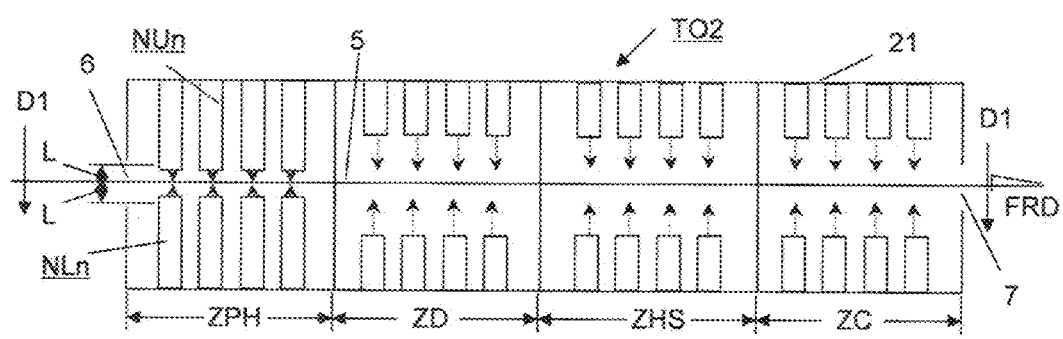
FIG. 7 is a longitudinal cross-sectional schematic diagram of an example of a tenter oven incorporating two or more zones having different film treatment conditions.

FIG. 7 is a longitudinal cross-sectional schematic diagram of an example of a tenter oven comprising two or more zones.

In FIG. 7, a tenter oven TO2 is enclosed with oven exterior walls 21 except for the entrance 6 and the exit 7. The interior of the tenter oven TO2 is divided into, for instance, a preheating zone ZPH, stretching zone ZD, heat setting zone ZHS, cooling zone ZC according to the functions required. In each zone, two or more air blowing nozzles are installed in such a manner as to face the upper and lower faces of the film passing plane to blow heated air onto the running film.

The preheating zone ZPH is a zone for a step to be taken before the film is stretched. If, for instance, the thermoplastic resin film is a sequential biaxially stretched film of polyester, it is a zone where the film is heated to a temperature at which crystallization does not progress but the film can be stretched.

If, an MD flow is generated in the preheating zone ZPH, which is the closest zone to the entrance 6 of the tenter oven TO2, as air flows with different temperatures flow in (e.g. air from outside the oven and leaked circulating air from the stretching zone), it mixes into the blown air, leading to problems such as unevenness in film thickness, inadequate stretchability, and, in the case of a coat having been applied to the film prior to the preheating step, uneven drying of the coat.

Such quality problems occurring in the preheating zone ZPH become amplified by the thermal history that the film goes through in the stretching zone ZD, heat setting zone ZHS and cooling zone ZC, which follow the preheating zone ZPH. The infiltration of outside air also cools the circulating air and unnecessarily pushes up the steam consumption by the heat exchanger.

According to studies conducted by the inventors, just installing proximate nozzles in part of the tenter oven TO2 (preheating zone) has the potential of achieving 60% or more of the energy consumption reduction effect obtained by installing proximate nozzles in all zones of the tenter oven TO2.

Meanwhile, applying proximate nozzles whose nozzle length is variable as shown in FIG. 6 to a late-stage zone of the tenter oven TO2, e.g. the heat setting zone ZHS, raises a concern about the failure of a nozzle due to the accumulation over time of oligomer deposits in the telescopic-interface gap between its movable nozzle element 15 and fixed nozzle element 14, given that large quantities of oligomer deposits are present in such a zone. It also raises another concern in that, if such oligomer deposits accumulate in a telescopic-interface gap onto the film surface, they give rise to foreign object defects and thus prevent the required product quality from being achieved.

As described above, installing proximate nozzles in the preheating zone makes it possible to achieve a dramatic MD flow suppression effect and energy efficiency improvement effect without a concern about nozzle failure. When installing proximate nozzles in the preheating zone, it is preferable that all air blowing nozzles in the preheating zone be proximate nozzles. Making all blowing nozzles in the preheating zone proximate nozzles amplifies the MD flow suppression effect and energy consumption reduction effect.

In some cases, a supply air duct and exhaust air duct are installed in one or more chambers to reduce dust in the tenter oven by ventilation. When proximate nozzles are used, it is preferable that the total flow rate of supply air and the total flow rate of exhaust air be balanced to enhance the MD flow suppression effect by setting the ratio between the two to 1 in the chamber or zone where proximate nozzles are installed. This is because an imbalance between the flow rates of supply air and exhaust air would generate an air flow in the running direction of the film, which would act as a disturbance. It is therefore preferable that, when using proximate nozzles in a preheating zone, where a supply air duct and exhaust air duct are present, the ratio between the total flow rate of supply air and the total flow rate of exhaust air in the preheating zone be set to 1.

If a shutter aimed at preventing air inflows is installed at the entrance and exit of a chamber or zone to which proximate nozzles are applied, more specifically 20 to 50 mm off the film passing plane towards the upper and lower air blowing surfaces (in the vertical direction), a great MD flow suppression effect can be obtained through a synergy effect with proximate nozzles.

To maximize the MD flow suppression effect and energy consumption reduction effect, it suffices to apply proximate nozzles to all zones of the tenter oven. When doing so, it is preferable that the ratio between the total flow rates of supply air and exhaust air be set to 1.

However, proximate nozzles whose length is adjustable in their length direction (direction perpendicular to the running direction of the film) as illustrated in FIG. 6 are more expensive to produce and prone to generate slight unevenness in the wind speed of blown air compared to ordinary proximate nozzles due to their structure. It is therefore preferable that, when applying proximate nozzles to all zones of the tenter oven, the extent of the use of proximate nozzles whose length is adjustable in their length direction be determined by taking fully into considerations of the cost performance, impact on the quality of the stretched films produced, and other factors.

In general, biaxially stretched thermoplastic resin films are commonly produced by first extruding a thermoplastic resin through a die onto a cooling drum to obtain an unstretched film, then stretching this unstretched film in its length direction (running direction), as needed, to obtain an uniaxially stretched film and finally stretching this uniaxially stretched film in its width direction in a tenter oven to obtain a biaxially stretched film (sequential biaxially stretching method) or by simultaneously stretching an unstretched film both in its running direction and width direction in a tenter oven to obtain a biaxially stretched film (simultaneous biaxial stretching method). As a tenter oven for such manufacturing processes, a tenter oven of the invention may be advantageously used.

Our stretched film method of manufacturing seeks to manufacture a biaxially stretched film from an unstretched film, obtained by extruding a thermoplastic resin through a die onto a cooling drum, or an already produced uniaxially stretched film by introducing it into a tenter oven. Biaxially stretched thermoplastic resin films manufactured using the stretched film manufacturing method have uniform characteristics and thickness in their width direction. The stretched film manufacturing method can also dramatically reduce the energy consumption associated with the heating of a film during its manufacturing process compared to conventional methods.

Our tenter ovens and methods will now be further described using examples.

Example 1

First, evaluation methods for the advantageous effects are described.

(1) MD Flow Measurement Method

Figure 8:
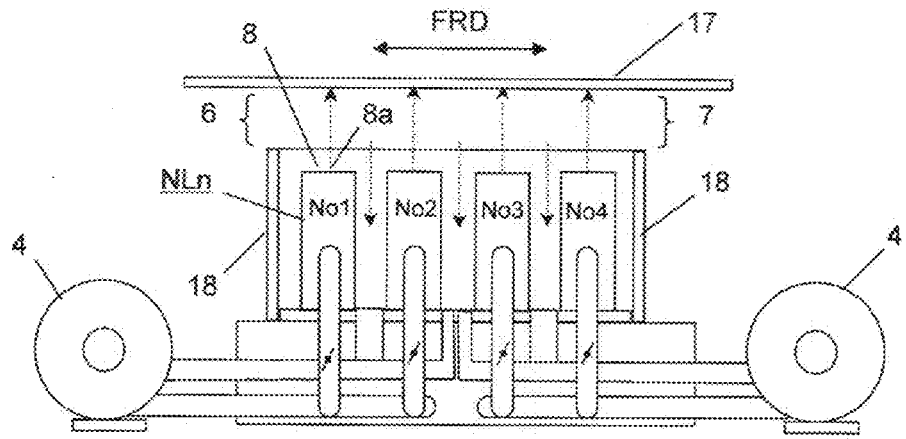
FIG. 8 is a side-view schematic diagram of a model testing machine that models a chamber that forms part of a tenter oven.

A model testing machine that models a chamber that forms part of a tenter oven of the invention was produced, and a MD flow was measured by using it. FIG. 8 is a side view schematic diagram of this model testing machine. To conduct tests simply and inexpensively, a thermoplastic resin film was simulated with a transparent acrylic plate 17 securely placed where the film passing plane 5 would be located. The size of the plate was 2.0 m in the simulated running direction of a film and 1.8 m in the simulated width direction of a running film.

The inside dimensions of the chamber of the model testing machine were 1.8 m in the simulated running direction of a film, 1.8 m in the simulated width direction of a film, and 1.5 m in height.

An opening 6 and another opening 7 were made in the left side exterior wall 18 and right side exterior wall 18 of the model testing machine as illustrated in FIG. 8 to simulate an entrance 6 and exit 7, respectively.

Below the acrylic plate 17, a series of four proximate nozzles NLn (n=1 to 4) were installed at a 0.3 m interval in the running direction of the film as air blowing nozzles. The air outlet 8a on the air blowing surface 8 of a proximate nozzle NLn was a slit having a width (gap) of 0.016 m in the running direction of the film and a length of 1.2 m in the width direction of the running film.

The air blowing surface 8 is positioned below the acrylic plate 17 and parallel to it. The model testing machine features a mechanism designed to adjust the distance L from the air blowing surface 8 to the underside of the acrylic plate 17. This distance L corresponds to the distance L from the air blowing surface 8 of a proximate nozzle NLn to the film passing plane 5.

Since the model testing machine uses the acrylic plate 17 as a substitute for a thermoplastic resin film, the fluttering of a film observed in a real tenter oven does not occur, the distance from the air blowing surface 8 to the underside of the acrylic plate 17 is maintained to the set value, regardless of the wind speed of blown air, air flow rate, passage of time, and the like. In the direction from the entrance 6 (opening 6) to the exit 7 (opening 7), proximate nozzles NLn were numbered from No. 1 to No. 4.

To recirculate the blown air through the inter-nozzle space after it hit acrylic plate 17, two circulation fans 4 were provided, one for the pair of adjacent proximate nozzles No. 1 and No. 2 (left side circulation fan 4 in FIG. 8) and the other for the pair of adjacent proximate nozzles No. 3 and No. 4 (right side circulation fan 4 in FIG. 8). To set the wind speed of blown air to about 20 m/s on average, the air flow rate of each circulation fan 4 was adjusted. No heat exchanger was installed, so that the circulated air was at room temperature. With all proximate nozzles NLn, the air blowing angle 22 (see FIG. 3b) was adjusted to 90±5°.

Figure 9:
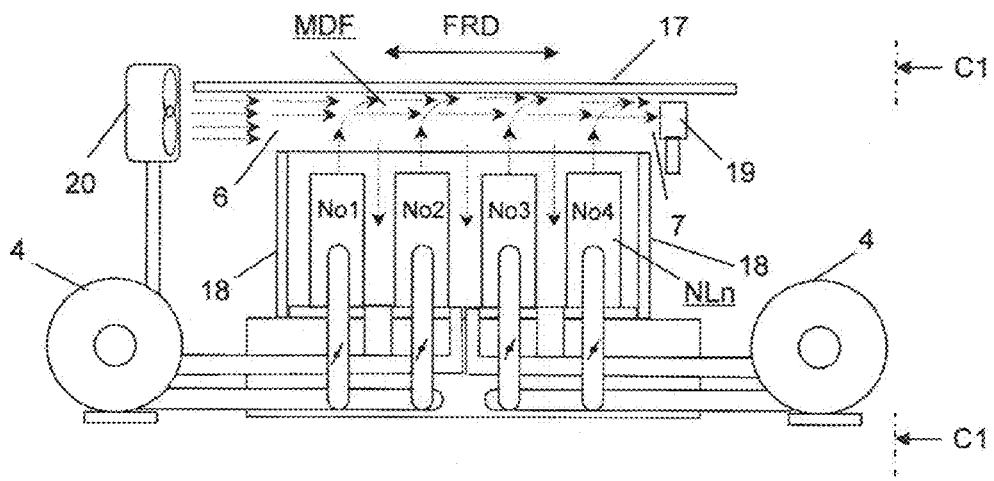
FIG. 9 is a side view schematic diagram describing a method to evaluate the size of the MD flow by generating a simulated running film induced air flow using the model testing machine in FIG. 8.

FIG. 9 is a side view schematic diagram describing the method to evaluate the size of the MD flow by generating a simulated running film induced air flow using the model testing machine in FIG. 8. As illustrated in FIG. 9, an air generator 20 was installed at the entrance 6 of the model testing machine. With the circulation fans 4 in operation to blow air out of each proximate nozzle NLn, the air generator 20 was operated to create an air flow along the underside of the acrylic plate 17 from the entrance 6 to the exit 7 of the model testing machine.

Figure 10:
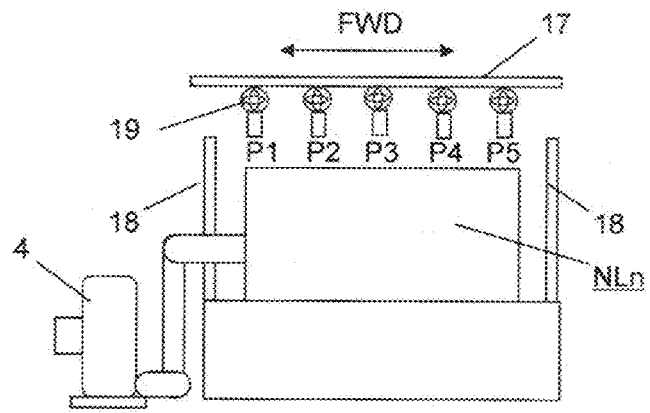
FIG. 10 is a front view schematic diagram as viewed in the direction indicated by the C1-C1 arrows in FIG. 9 that describes wind speed measurement locations for the MD flow.

FIG. 10 is a front view schematic diagram as viewed in the direction indicated by the C1-C1 arrows in FIG. 9 that describes wind speed measurement locations for the MD flow. Five anemometers 19 were installed at the exit 7 of the model testing machine at more or less equal intervals in the width direction of the film. As the distance from the air blowing surface 8 to the underside of the acrylic plate 17 was changed, the wind speed of the air flow exiting from the exit 7 was measured using the anemometers 19, with the wind speed readings obtained taken as the values of the MD flow. The wind speed of the air flow generated by the air generator 20 was adjusted so that it is about 3 m/s at the entrance 6 of the model testing machine with a tolerance of ±0.5 m/s in the width direction of the film.

The measurement locations of the MD flow will now be described by referring to FIG. 10.

The MD flow was measured at the exit 7 of the model testing machine, using five anemometers 19 installed at five points, P1, P2, P3, P4 and P5, set up just below the acrylic plate 17 at a more or less uniform interval in the width direction of the film. The anemometers 19 were 80 mm vane anemometers. The observational faces of the vane anemometers were pointed in the running direction of the film, the wind speed of the air flow occurring in the running direction of the film was measured at the exit 7. As the wind speed of the MD flow constantly changed, the sampling period was set to 1 second, and a continuous measurement of 15 seconds was made, with the average of the readings accepted as the wind speed of the MD flow.

(2) Temperature Unevenness Measurement Method

An opening measuring 150 mm wide and 150 mm long was made in the acrylic plate 17 of the model testing machine around the center of the projection of proximate nozzle No. 2 onto the acrylic plate 17. In this opening, a sheet-style rubber heater measuring 150 mm wide and 150 mm long was installed. An infrared thermograph was also installed above the sheet-style rubber heater at a distance 0.7 m from the top surface of the acrylic plate 17, with the measurement field of view of the infrared thermograph adjusted so that the temperature distribution of the whole surface of the sheet-style rubber heater can be photographed in one go.

The rubber heater was heated at 100° C., and, while the room temperature air was blown out of the proximate nozzle onto the rubber heater, a horizontal air flow was generated using the air generator 20 installed at the entrance 6 of the model testing machine. Under this setup, the surface temperature distribution of the rubber heater was photographed using the infrared thermograph, and the obtained thermal image was analyzed with bundled analysis software to measure the temperature unevenness caused to the rubber heater by the simulated MD flow across the model testing machine.

(3) Heating Efficiency Measurement Method

Like the above temperature unevenness measurement method, the heating efficiency of a proximate nozzle was measured using the built-in rubber heater. More specifically, air was blown out of a proximate nozzle onto the heated rubber heater, and the rate of heat generation, temperature of the blown air and temperature of the rubber heater after air blowing were measured, followed by the calculation of the heating efficiency of a proximate nozzle in terms of its heat transfer coefficient using the formula below. During the measurement of the heating efficiency, the air generator 20 was turned off, so that the measured heating efficiency is solely attributable to the proximate nozzle.

Heat transfer coefficient [W/m$^2$K]=Rate of heat generation by rubber heater/[(Temperature of rubber heater after air blowing)−(Temperature of blown air)]   Formula:

The rate of heat generation by the rubber heater [W] was obtained by measuring the electric current [A] and voltage [V] of the rubber heater while the blown air was being cooled and applying the following formula: Rate of heat generation [W]=Electric current [A]×Voltage [V].

Using the above model testing machine, the wind speed of the MD flow [m/s], heating efficiency [W/m$^2$K] and temperature unevenness [° C.] were obtained after setting the distance L from the air blowing surface 8 to the underside of the acrylic plate 17 to 50 mm and the L/B value to 3.1. The results are shown in Table 1.

Example 2

The wind speed of the MD flow [m/s], heating efficiency [W/m²K] and temperature unevenness [° C.] were obtained in the same manner as Example 1, except that the distance L from the air blowing surface 8 to the underside of the acrylic plate 17 and the L/B value were set to 75 mm and 4.7, respectively. The results are shown in Table 1.

Example 3

The wind speed of the MD flow [m/s], heating efficiency [W/m²K] and temperature unevenness [° C.] were obtained in the same manner as Example 1, except that the distance L from the air blowing surface 8 to the underside of the acrylic plate 17 and the L/B value were set to 100 mm and 6.3, respectively. The results are shown in Table 1.

Example 4

The wind speed of the MD flow [m/s], heating efficiency [W/m²K] and temperature unevenness [° C.] were obtained in the same manner as Example 1, except that the distance L from the air blowing surface 8 to the underside of the acrylic plate 17 and the L/B value were set to 150 mm and 9.4, respectively. The results are shown in Table 1.

Example 5

The wind speed of the MD flow [m/s], heating efficiency [W/m²K] and temperature unevenness [° C.] were obtained in the same manner as Example 1, except that the angle formed by the flow direction of the air blown out of the nozzle and the film passing plane (air blowing angle) was set to 110±50 for all proximate nozzles NLn. The results are shown in Table 1.

Example 6

Pellets of a polyethylene terephthalate resin (manufactured by Toray Industries, Inc., F20S) were dried under reduced pressure and molded into a sheet by feeding it to an extruding machine and melt-extruding it at 280° C. The obtained sheet was brought into close contact with the surface of a 1600 mm-diameter cooling drum whose surface temperature had been maintained at 20° C. via an electrostatic method to solidify it by cooling, thereby turning it into a 2100 μm-thick thermoplastic resin film.

This thermoplastic resin film was heated using a group of heated rolls and an infrared ray heater and then stretched 3.2-fold in its running direction using a group of rolls with differences in circumferential speed to an uniaxially stretched film.

The obtained uniaxially stretched film was introduced into a tenter oven comprising a preheating zone, stretching zone, heat setting zone and cooling zone. Each zone was configured from two or more chambers, each as illustrated in FIG. 1. More specifically, the preheating zone had two chambers, the stretching zone four, the heat setting zone four, and the cooling zone two. Each chamber was 3 m high, 3 m long and 2 m wide. In each chamber, a set of five slit nozzles NUn and another set of slit nozzles NLn were installed above and below the film passing plane, respectively. With all slit nozzles, the angle formed by the flow direction of the air blown out of the nozzle and the film passing plane (air blowing angle) was set to 90±5°.

All slit nozzles in the preheating zone were proximate nozzles with a distance from the air blowing surface to the film passing plane L of 50 mm. In other zones, slit nozzles with a distance L from the air blowing surface to the film passing plane of 170 mm were used.

Those slit nozzles and proximate nozzle had a slit with a slit gap of 10 mm. This means that the L/B value, the ratio of the distance L from the air blowing surface to the film passing plane to the slit gap B, was 5 in the preheating zone and 17 in other zones.

In each chamber, hot air heated to a prescribed temperature was blown out of the slit nozzles or proximate nozzles, as the case may be, on to the film via a circulation fan to provide the film with a desired heat treatment.

Holding its edges with clips, the uniaxially stretched film was passed through the preheating zone, set to a temperature of 100° C. and introduced into the stretching zone, set to a temperature of 130° C., where the uniaxially stretched film was stretched 3.5-fold in its width direction. While maintaining its stretched width, the film was then provided with a heat setting treatment at a temperature of 220° C. in the heat setting zone, followed by a cooling treatment at a temperature of 100° C. in the cooling zone. After this, the film had both of its edges trimmed and taken up on take-up equipment to obtain a biaxially stretched film with a thickness of 188 μm and a width of 3450 mm. The temperature of each zone was the temperature of the hot air blown out of the slit nozzles or proximate nozzles, as the case may be. The running speed of the film was 25 m/min.

The obtained biaxially stretched film was trimmed by 225 mm from both ends and split into three to obtain three biaxially stretched film rolls, each 1000 mm wide and 2000 m long. Of these three rolls, the one taken from the middle region of the original biaxially stretched film was used to prepare a film roll sample for the measurement of unevenness in film thickness.

The measurement of unevenness in film thickness was conducted on three 40 mm-wide thickness measurement samples cut out from three different locations of a film sample 1 m long and 600 mm wide along its width direction as follows: middle and 100 mm from either edge in terms of the central points of the respective measurement samples. More specifically, the thickness of each thickness measurement sample was continuously measured in the running direction of the film using a contact-type thickness meter (made by Anritsu Corporation, KG60/A) and the measurements were output to chart recorder. From the thickness profile obtained, the maximum thickness μm and minimum thickness μm along the running direction of the film were found, as well as the arithmetic mean μm of the continuous distribution (hereinafter referred to simply as the average μm. The percentage ratio of the difference between the maximum thickness and the minimum value to the average thickness was then calculated and taken as unevenness in thickness R [unit: %]. The value of unevenness in thickness R attributed to the example is the average of the readings from three measurement samples.

As illustrated in FIG. 10, the measurement of the MD flow was conducted at the exit of the tenter oven and measured wind speed at five points with equal interval between them in the width direction of the film and calculated their average.

The electricity consumption reduction rate [%] and steam reduction rate [%] of the tenter oven, compared to before the application of proximate nozzles, were calculated. Prior to the application of proximate nozzles means the state of the tenter oven in which the distance L from the air blowing surface to the film passing plane was 170 mm for all nozzles.

The electricity consumption reduction rate [%] was calculated from the sum of electricity consumption by the circulation fan across all chambers [kWh](total electricity consumption) before and after the introduction of proximate nozzles using the following formula:

> Electricity consumption reduction rate [%]=[(Reduction in total electricity consumption from before to after introduction of proximate nozzles)/(Total electricity consumption before introduction of proximate nozzles)]×100.   Formula:

Electricity consumption by the circulation fan in a chamber [kWh] was calculated using the following formula:

> Electricity consumption by circulation fan [kWh]= [Rated output of circulation fan [kWh]×(Operating frequency of circulation fan [Hz]/Rated frequency of circulation fan [Hz])³/Inverter efficiently].   Formula:

The steam consumption reduction rate [%] was calculated from the sum of steam consumption by the heat exchanger across all chambers [t/year](total steam consumption) before and after the introduction of proximate nozzles using the following formula:

> Steam consumption reduction rate [%]=[(Reduction in total steam consumption from before to after introduction of proximate nozzles)/(Total steam consumption before introduction of proximate nozzles)]×100.   Formula:

Let hourly steam consumption is Q [kg/h].

If $P2>0.5\times P1$, $$Q=Cv\times 197.8\times((P1-P2)\times P2)^{0.5}$$

If $P2\leq 0.5\times P1$, $$Q=Cv\times 98.9\times P1$$

Where, P1 [MPa]: the absolute pressure on the primary side of the control valve for the heat exchanger; P2 [MPa]: the absolute pressure on the secondary side of the control valve for the heat exchanger; and Cv: a constant determined by the type of the control valve and its opening (estimated from the performance curve of the valve).

In each chamber of the tenter oven, a supply air duct and exhaust air duct were installed, and, in the preheating zone, where proximate nozzles had been installed, the circulation fan was adjusted to maintain the ratio between the total flow rate of supply air and the total flow rate of exhaust air in the preheating zone at 1.

Various measurement conditions and results for Example 6 are shown in Table 2.

Example 7

The width direction unevenness in thickness [%] of the film upon exiting the tenter oven and the wind speed of the MD flow at the exit of the tenter oven were measured in the same manner as Example 6, except that proximate nozzles were applied to all slit nozzles in the preheating zone and stretching zone and that the ratio between the total flow rate of supply air and the total flow rate of exhaust air of the preheating and stretching zones was set to 1. The electricity consumption reduction rate [%] and steam reduction rate [%] of the tenter oven, compared to before the application of proximate nozzles, were also calculated. Various measurement conditions and results for Example 7 are shown in Table 2.

Example 8

The width direction unevenness in thickness [%] of the film upon exiting the tenter oven and the wind speed of the MD flow at the exit of the tenter oven were measured in the same manner as Example 6, except that proximate nozzles were applied to all slit nozzles in the preheating zone, stretching zone and heat setting zone and that the ratio between the total flow rate of supply air and the total flow rate of exhaust air of the preheating, stretching and heat setting zones was set to 1. The electricity consumption reduction rate [%] and steam reduction rate [%] of the tenter oven, compared to before the application of proximate nozzles, were also calculated. Various measurement conditions and results for Example 8 are shown in Table 2.

Example 9

The width direction unevenness in thickness [%] of the film upon exiting the tenter oven and the wind speed of the MD flow at the exit of the tenter oven were measured in the same manner as Example 6, except that proximate nozzles were applied to all slit nozzles in all zones (from the preheating zone to the cooling zone) and the total flow rate of exhaust air of all zones was set to 1. The electricity consumption reduction rate [%] and steam reduction rate [%] of the tenter oven, compared to before the application of proximate nozzles, were also calculated. Various measurement conditions and results for Example 9 are shown in Table 2.

Example 10

The width direction unevenness in thickness [%] of the film upon exiting the tenter oven and the wind speed of the MD flow at the exit of the tenter oven were measured in the same manner as Example 6, except that, in all zones of the tenter oven (from the preheating zone to the cooling zone), five proximate nozzles per chamber were installed only below the film passing plane. The electricity consumption reduction rate [%] and steam reduction rate [%] of the tenter oven, compared to before the application of proximate nozzles, were also calculated. Various measurement conditions and results for Example 10 are shown in Table 2.

Example 11

Proximate nozzles were installed in all zones of the tenter oven (from the preheating zone to the cooling zone), and the width direction unevenness in thickness [%] of the film upon exiting the tenter oven and the wind speed of the MD flow at the exit of the tenter oven were measured in the same manner as Example 6, except that the air blowing angle was set to 110±5°. The electricity consumption reduction rate [%] and steam reduction rate [%] of the tenter oven, compared to before the application of proximate nozzles, were also calculated. Various measurement conditions and results for Example 11 are shown in Table 2.

Comparative Example 1

The wind speed of the MD flow [m/s], heating efficiency [W/m²K] and temperature unevenness [° C.] were obtained in the same manner as Example 1, except that, in the model testing machine used in Examples 1 to 3, the distance from the air blowing surface 8 to the underside of the acrylic plate 17 was set to 170 mm and that the L/B value was set to 10.6. The results are shown in Table 1.

Comparative Example 2

The wind speed of the MD flow [m/s], heating efficiency [$W/m^2K$] and temperature unevenness [° C.] were obtained in the same manner as Comparative example 1, except that the distance from the air blowing surface 8 to the underside of the acrylic plate 17 was set to 200 mm and that the L/B value was set to 12.5. The results are shown in Table 1.

Comparative Example 3

The wind speed of the MD flow [m/s], heating efficiency [$W/m^2K$] and temperature unevenness [° C.] were obtained in the same manner as Comparative example 1, except that the distance from the air blowing surface 8 to the underside of the acrylic plate 17 was set to 250 mm and that the L/B value was set to 15.6. The results are shown in Table 1.

Comparative Example 4

The width direction unevenness in thickness [%] of the film upon exiting the tenter oven and the wind speed of the MD flow at the exit of the tenter oven were measured in the same manner as Example 6, except that proximate nozzles were not applied to any zone, that the distance L from the air blowing surface to the film passing plane was set to 170 mm and that the ratio between the total flow rate of supply air and the total flow rate of exhaust air of all zone was set to 0.76. The electricity consumption reduction rate [%] and steam reduction rate [%] of the tenter oven, compared to before the application of proximate nozzles, were also calculated. Various measurement conditions and results for Comparative example 4 are shown in Table 2.

According to the results obtained from those examples and comparative examples, setting the distance L from the air blowing surface to the film passing plane to 150 mm or less makes it possible to reduce the temperature unevenness of the film and the temperature unevenness and heating unevenness of blowing nozzles. Also, installing proximate nozzles with a distance L from the air blowing surface to the film passing plane of 150 mm or less at least in the preheating zone of the tenter oven makes it possible to suppress the MD flow and improve unenvenness in film thickness. In addition, proximate nozzles constitute an effective means of reducing the energy consumptions in electricity and steam of the tenter oven.

TABLE 1

| | Distance L from air blowing surface to surface of acrylic plate [mm] | Slit gap B [mm] | L/B | Velocity of blown air [m/s] |
|---|---|---|---|---|
| Example 1 | 50 | 16 | 3.1 | 20 |
| Example 2 | 75 | 16 | 4.7 | 20 |
| Example 3 | 100 | 16 | 6.3 | 20 |
| Example 4 | 150 | 16 | 9.4 | 20 |
| Example 5 | 50 | 16 | 3.1 | 20 |
| Comparative example 1 | 170 | 16 | 10.6 | 20 |
| Comparative example 2 | 200 | 16 | 12.5 | 20 |
| Comparative example 3 | 250 | 16 | 15.6 | 20 |

| | Velocity of MD flow [m/S] | | | | | | Heating efficiency (heat transfer coefficient) [$W/m^2K$] | Unevenness in temperature [° C.] | Air blowing angle [°] |
|---|---|---|---|---|---|---|---|---|---|
| | P1 | P2 | P3 | P4 | P5 | Average | | | |
| Example 1 | 0.3 | 0.4 | 0.5 | 0.4 | 0.3 | 0.38 | 102 | 0.5 | 90 ± 5 |
| Example 2 | 0.4 | 0.5 | 0.6 | 0.5 | 0.4 | 0.48 | 96 | 0.9 | 90 ± 5 |
| Example 3 | 0.7 | 0.8 | 1 | 0.8 | 0.7 | 0.8 | 93 | 1.5 | 90 ± 5 |
| Example 4 | 1 | 1.3 | 1.5 | 1.3 | 1 | 1.22 | 81 | 2 | 90 ± 5 |
| Example 5 | 0.8 | 0.9 | 1.2 | 0.9 | 0.8 | 0.92 | 95 | 1.7 | 110 ± 5 |
| Comparative example 1 | 2.1 | 2.3 | 2.5 | 2.3 | 2.1 | 2.26 | 79 | 4 | 90 ± 5 |
| Comparative example 2 | 2.6 | 2.8 | 3.0 | 2.8 | 2.6 | 2.76 | 73 | 5 | 90 ± 5 |
| Comparative example 3 | 3.6 | 3.8 | 4.0 | 3.8 | 3.6 | 3.76 | 64 | 6 | 90 ± 5 |

TABLE 2

| | Distance L from air blowing surface to film passing plane [mm] | | | | | | | |
|---|---|---|---|---|---|---|---|---|
| | Preheating zone | | Stretching zone | | Heat setting zone | | Cooling zone | |
| | L | L/B | L | L/B | L | L/B | L | L/B |
| Example 6 | 50 | 5 | 170 | 17 | 170 | 17 | 170 | 17 |
| Example 7 | 50 | 5 | 50 | 5 | 170 | 17 | 170 | 17 |
| Example 8 | 50 | 5 | 50 | 5 | 50 | 5 | 170 | 17 |
| Example 9 | 50 | 5 | 50 | 5 | 50 | 5 | 50 | 5 |
| Example 10 | 50 | 5 | 50 | 5 | 50 | 5 | 50 | 5 |
| Example 11 | 50 | 5 | 50 | 5 | 50 | 5 | 50 | 5 |
| Comparative example 4 | 170 | 17 | 170 | 17 | 170 | 17 | 170 | 17 |

| | Unevenness in thickness [%] | Average velocity of MD flow at tenter oven exit [m/s] | Electric power consumption reduction rate [%] | Steam consumption reduction rate [%] | Air blowing angle [°] | Nozzle arrangement |
|---|---|---|---|---|---|---|
| Example 6 | 8 | 4 | 20.0 | 10.0 | 90 ± 5 | Above and below, facing each other |
| Example 7 | 7 | 3.5 | 23.0 | 11.5 | 90 ± 5 | Above and below, facing each other |
| Example 8 | 6 | 3 | 25.0 | 12.5 | 90 ± 5 | Above and below, facing each other |
| Example 9 | 5 | 2.5 | 30.0 | 15.0 | 90 ± 5 | Above and below, facing each other |
| Example 10 | 7 | 4 | 21.0 | 10.5 | 90 ± 5 | Below only |
| Example 11 | 8 | 5 | 19.0 | 9.5 | 110 ± 5 | Above and below, facing each other |
| Comparative example 4 | 14 | 7 | — | — | 90 ± 5 | Above and below, facing each other |

INDUSTRIAL APPLICABILITY

Our tenter ovens feature two or more air blowing nozzles characterized by the fact that at least one of those air blowing nozzles is a proximate nozzle that has a slit-shaped air outlet on its air blowing surface and the distance L from the air blowing surface and the width B of the slit gap satisfy the formula: L/B≤10 provided that the distance L is 150 mm or less.

For this reason, our tenter ovens are capable of suppressing the air flow in the running direction of the film that is apt to occur in a tenter oven (MD flow). As a result, our tenter ovens are advantageously used for the manufacture of stretched films having very little unevenness in thickness.

Since our tenter ovens suppress an internal MD flow, they stabilize the manufacturing steps of a tenter oven and reduce energy consumption.

The invention claimed is:

1. A tenter oven comprising an entrance for a running film of a thermoplastic resin at one end thereof and an exit for the running film at the other end thereof, in which a plurality of air blowing nozzles that blow heated air to the running film is provided such that at least one of the air blowing nozzles faces an upper face of a passing plane of the running film which is formed from the entrance to the exit and at least another one of the air blowing nozzles faces a lower face of the passing plane of the running film, wherein 1) an air outlet that blows the heated air out is provided in each of the air blowing nozzles on an air blowing surface thereof facing the film passing plane and a stretching zone that stretches the running film in a width direction thereof is provided at a position between the entrance and the exit; 2) at least one of the plurality of air blowing nozzles is a proximate nozzle in which the air outlet provided on the air blowing surface is formed with a slit being elongated in the width direction of the film and satisfying formula: (L/B)≤10, wherein L is a distance between the air blowing surface and the film passing plane; B is slit width in a running direction of the film; and the distance L is 150 mm or less, 3) the proximate nozzles comprise a housing and the housing has a flow path for the heated air supplied from a supply source therein and the air blowing surface on one of the faces thereof, and wherein the housing comprises a fixed housing and movable housings provided respectively at either end of the fixed housing, and the movable housings are movable in the width direction of the running film to the fixed housing, and 4) a joint portion between the moving housing and rail cover has an elongated hole and a structure engaging a pin mechanism or link mechanism with the elongated hole.

2. The tenter oven according to claim 1, wherein at least one of the plurality of proximate nozzles faces the upper face of the film passing plane, and at least another faces the lower face of the film passing plane.

3. The tenter oven according to claim 2, wherein the air blowing surfaces of at least a pair of proximate nozzles, one facing the upper face of the film passing plane and the other facing the lower face of the film passing plane, face each other across the film passing plane.

4. The tenter oven according to claim 3, wherein an air blowing angle formed between the film passing plane and the flow direction of air blown out of the slit of the proximate nozzle towards the film passing plane is 85 to 95°.

5. The tenter oven according to claim 3, wherein a preheating zone that preheats the running film is provided at the side of the entrance in the stretching zone and the proximate nozzle is provided at at least part of the preheating zone.

6. The tenter oven according to claim 3, wherein at least one of the proximate nozzles comprises a housing and the housing has a flow path for the heated air supplied from a supply source therein and the air blowing surface on one of the faces thereof, and wherein the housing comprises a fixed housing and movable housings provided respectively at either end of the fixed housing, and the movable housings are movable in the width direction of the running film to the fixed housing.

7. The tenter oven according to claim 2, wherein an air blowing angle formed between the film passing plane and the flow direction of air blown out of the slit of the proximate nozzle towards the film passing plane is 85 to 95°.

8. The tenter oven according to claim 2, wherein a preheating zone that preheats the running film is provided at the side of the entrance in the stretching zone and the proximate nozzle is provided at at least part of the preheating zone.

9. The tenter oven according to claim 2, wherein at least one of the proximate nozzles comprises a housing and the housing has a flow path for the heated air supplied from a supply source therein and the air blowing surface on one of the faces thereof, and wherein the housing comprises a fixed housing and movable housings provided respectively at either end of the fixed housing, and the movable housings are movable in the width direction of the running film to the fixed housing.

10. The tenter oven according to claim 1, wherein an air blowing angle formed between the film passing plane and the flow direction of air blown out of the slit of the proximate nozzle towards the film passing plane is 85 to 95°.

11. The tenter oven according to claim 10, wherein a preheating zone that preheats the running film is provided at the side of the entrance in the stretching zone and the proximate nozzle is provided at at least part of the preheating zone.

12. The tenter oven according to claim 10, wherein at least one of the proximate nozzles comprises a housing and the housing has a flow path for the heated air supplied from a supply source therein and the air blowing surface on one of the faces thereof, and wherein the housing comprises a fixed housing and movable housings provided respectively at either end of the fixed housing, and the movable housings are movable in the width direction of the running film to the fixed housing.

13. The tenter oven according to claim 1, wherein a preheating zone that preheats the running film is provided at the side of the entrance in the stretching zone and the proximate nozzle is provided at at least part of the preheating zone.

14. The tenter oven according to claim 13, wherein at least one of the proximate nozzles comprises a housing and the housing has a flow path for the heated air supplied from a supply source therein and the air blowing surface on one of the faces thereof, and wherein the housing comprises a fixed housing and movable housings provided respectively at either end of the fixed housing, and the movable housings are movable in the width direction of the running film to the fixed housing.

15. The tenter oven according to claim 1, wherein left and right clip moving devices move a number of clips holding both edges of the running film from the entrance to the exit and left and right rails are provided to guide the left and right clip moving devices, and wherein the rails are installed to allow the distance therebetween in the width direction of the running film to be changed and left and right rail covers are provided to cover the left and right rails, and further wherein each of the movable housings are joined to a closer one of the pair of rail covers via a coupler to be rendered movable in the width direction of the running film by the coupler according to a change in distance between the left and right rails.

16. The tenter oven according to claim 1, wherein at least one of the proximate nozzles has a protective cover installed along one or both sides of the slit that prevent the running film from coming into contact with the edge of the proximate nozzle.

17. The tenter oven according to claim 1, wherein the moving housings are movable inside the both ends of the fixed housing.

18. The tenter oven according to claim 1, wherein the faces of proximate nozzles are substantially free of sharp features.

19. A method of manufacturing a stretched film comprising:
introducing an unstretched or a uniaxially stretched film of a thermoplastic resin as a running film into a tenter oven as described in claim 1 from the entrance thereof,
heat-treating the film in the tenter oven with the heated air blown out from the one or more slit nozzles and stretching the running film in the width direction thereof during the heat-treating, and
drawing out a stretched film from the exit.

* * * * *